United States Patent
Gass

(10) Patent No.: US 9,927,796 B2
(45) Date of Patent: Mar. 27, 2018

(54) BAND SAW WITH IMPROVED SAFETY SYSTEM

(75) Inventor: Stephen F. Gass, Wilsonville, OR (US)

(73) Assignee: SawStop Holding LLC, Taulatin, OR (US)

(*) Notice: Subject to any disclaimer, the term of this patent is extended or adjusted under 35 U.S.C. 154(b) by 1132 days.

(21) Appl. No.: 10/146,527

(22) Filed: May 15, 2002

(65) Prior Publication Data

US 2002/0170400 A1 Nov. 21, 2002

Related U.S. Application Data

(60) Provisional application No. 60/292,100, filed on May 17, 2001.

(51) Int. Cl.

| | | |
|---|---|---|
| *B27B 13/14* | (2006.01) | |
| *G05B 19/4061* | (2006.01) | |
| *B23D 55/00* | (2006.01) | |
| *B23D 59/00* | (2006.01) | |
| *B27B 13/16* | (2006.01) | |
| *B27G 19/00* | (2006.01) | |
| *B27G 19/02* | (2006.01) | |

(Continued)

(52) U.S. Cl.
CPC ......... *G05B 19/4061* (2013.01); *B23D 55/00* (2013.01); *B23D 59/001* (2013.01); *B27B 13/14* (2013.01); *B27B 13/16* (2013.01); *B27G 19/00* (2013.01); *B27G 19/02* (2013.01); *B27G 19/06* (2013.01); *B27G 21/00* (2013.01); *F16P 3/12* (2013.01); *G05B 2219/45044* (2013.01); *G05B 2219/49152* (2013.01); *G05B 2219/49159* (2013.01); *Y10T 83/081* (2015.04); *Y10T 83/089* (2015.04); *Y10T 83/707* (2015.04); *Y10T 83/7083* (2015.04)

(58) Field of Classification Search
CPC .. B26D 7/24; B27B 5/38; B27B 13/14; B27G 19/02; B27G 19/06; B23D 47/08; G05B 9/02
USPC ........ 324/663, 658; 327/517; 83/DIG. 1, 58, 83/62, 62.1, 788, 820; 192/129 R
See application file for complete search history.

(56) References Cited

U.S. PATENT DOCUMENTS

| | | |
|---|---|---|
| 941,726 A | 11/1909 | Pfalzgraf |
| 982,312 A | 1/1911 | Swafford |

(Continued)

FOREIGN PATENT DOCUMENTS

| | | |
|---|---|---|
| CA | 2140991 | 1/1995 |
| CH | 297525 | 6/1954 |

(Continued)

OTHER PUBLICATIONS

U.S. Appl. No. 60/157,340, filed Oct. 1, 1999, entitled "Fast-Acting Safety Stop."

(Continued)

*Primary Examiner* — Kenneth E Peterson

(57) ABSTRACT

A band saw including a frame, at least two, spaced apart, rotatable wheels supported by the frame, a blade looped around the wheels, where rotation of at least one wheel causes the blade to move around the wheels, a detection system adapted to detect a dangerous condition between a person and the blade, and a reaction system configured to engage and stop the blade within 10 milliseconds after detection of the dangerous condition is disclosed. The reaction system may be configured to cut and grip the blade.

8 Claims, 16 Drawing Sheets

(51) Int. Cl.
*B27G 19/06* (2006.01)
*B27G 21/00* (2006.01)
*F16P 3/12* (2006.01)

(56) References Cited

U.S. PATENT DOCUMENTS

| | | | |
|---|---|---|---|
| 1,205,246 A | 11/1916 | Mowry | |
| 1,450,906 A | 4/1923 | Anderson | |
| 1,551,900 A | 9/1925 | Morrow | |
| 1,582,483 A | 4/1926 | Runyan | |
| 1,584,086 A | 5/1926 | Fonda | |
| 1,590,988 A | 6/1926 | Campbell | |
| 1,668,061 A | 5/1928 | Falkins | |
| 1,756,287 A | 4/1930 | Freshwater et al. | |
| 1,787,191 A | 12/1930 | Fisk | |
| 1,807,120 A | 5/1931 | Lewis | |
| 1,811,066 A | 6/1931 | Tannewitz | |
| 1,816,069 A | 7/1931 | Bennett | |
| 1,896,924 A | 2/1933 | Ulrich | |
| 1,902,270 A | 3/1933 | Tate | |
| 1,910,651 A | 5/1933 | Tautz | |
| 1,938,548 A | 12/1933 | Tautz | |
| 1,938,549 A | 12/1933 | Tautz | |
| 1,960,930 A | 5/1934 | Thomas | |
| 1,963,688 A | 6/1934 | Tautz | |
| 2,007,887 A | 7/1935 | Tautz | |
| 2,008,673 A | 7/1935 | Ocenasek | |
| 2,020,222 A | 11/1935 | Tautz | |
| 2,038,810 A | 4/1936 | Tautz | |
| 2,044,481 A | 6/1936 | Manley et al. | |
| 2,106,288 A | 1/1938 | Tautz | |
| 2,121,069 A | 6/1938 | Collins | |
| 2,163,320 A | 6/1939 | Hammond | |
| 2,241,556 A | 5/1941 | MacMillin et al. | |
| 2,286,589 A | 6/1942 | Tannewitz | |
| 2,305,928 A | 12/1942 | Littell | |
| 2,313,686 A | 3/1943 | Uremovich | |
| 2,328,244 A | 8/1943 | Woodward | |
| 2,352,235 A | 6/1944 | Tautz | |
| 2,377,265 A | 3/1945 | Rady | |
| 2,392,486 A | 1/1946 | Larsen | |
| 2,402,232 A * | 6/1946 | Baker | 379/303 |
| 2,425,331 A | 8/1947 | Kramer | |
| 2,434,174 A | 1/1948 | Morgan | |
| 2,452,589 A * | 11/1948 | Mcwhirter et al. | 340/3.24 |
| 2,466,325 A | 4/1949 | Ocenasek | |
| 2,496,613 A | 2/1950 | Woodward | |
| 2,501,134 A | 3/1950 | Meckoski et al. | |
| 2,509,813 A | 5/1950 | Dineen | |
| 2,517,649 A | 8/1950 | Frechtmann | |
| 2,523,680 A | 9/1950 | Christie | |
| 2,562,396 A | 7/1951 | Schutz | |
| 2,572,326 A | 10/1951 | Evans | |
| 2,593,596 A | 4/1952 | Olson | |
| 2,596,524 A | 5/1952 | Bridwell | |
| 2,601,878 A | 7/1952 | Anderson | |
| 2,623,555 A | 12/1952 | Eschenburg | |
| 2,661,780 A | 12/1953 | Morgan | |
| 2,675,707 A | 4/1954 | Brown | |
| 2,690,084 A | 9/1954 | Van Dam | |
| 2,719,547 A | 10/1955 | Gjerde | |
| 2,722,246 A | 11/1955 | Arnoldy | |
| 2,731,049 A | 1/1956 | Akin | |
| 2,736,348 A | 2/1956 | Nelson | |
| 2,737,213 A | 3/1956 | Richards et al. | |
| 2,785,710 A | 3/1957 | Mowery, Jr. | |
| 2,786,496 A | 3/1957 | Eschenburg | |
| 2,804,890 A | 9/1957 | Fink | |
| 2,839,943 A | 6/1958 | Caldwell et al. | |
| 2,851,068 A | 9/1958 | Goodlet | |
| 2,876,809 A | 3/1959 | Rentsch et al. | |
| 2,883,486 A * | 4/1959 | Mason | 200/181 |
| 2,913,581 A | 11/1959 | Simonton et al. | |
| 2,937,672 A | 5/1960 | Gjerde | |
| 2,946,418 A | 7/1960 | Leeson, Jr. | |
| 2,954,118 A | 9/1960 | Anderson | |
| 2,954,808 A | 10/1960 | Sweeney et al. | |
| 2,957,166 A * | 10/1960 | Gluck | 365/233 |
| 2,974,693 A | 3/1961 | Goldschmidt et al. | |
| 2,977,156 A | 3/1961 | Gioia | |
| 2,978,084 A | 4/1961 | Vilkaitis | |
| 2,984,268 A | 5/1961 | Vuichard | |
| 2,991,593 A | 7/1961 | Cohen | |
| 3,007,501 A | 11/1961 | Mundell et al. | |
| 3,011,533 A | 12/1961 | Newman, Sr. | |
| 3,011,610 A | 12/1961 | Stiebel et al. | |
| 3,035,995 A | 5/1962 | Seeley et al. | |
| 3,047,116 A | 7/1962 | Stiebel et al. | |
| 3,105,528 A | 10/1963 | Loughridge | |
| 3,124,178 A | 3/1964 | Packard | |
| 3,129,731 A | 4/1964 | Tyrrell | |
| 3,163,732 A | 12/1964 | Abbott | |
| 3,184,001 A | 5/1965 | Reinsch et al. | |
| 3,186,256 A | 6/1965 | Reznick | |
| 3,207,273 A | 9/1965 | Jurin | |
| 3,213,731 A | 10/1965 | Renard | |
| 3,224,474 A | 12/1965 | Bloom | |
| 3,246,205 A | 4/1966 | Miller | |
| 3,276,497 A | 10/1966 | Heer | |
| 3,280,861 A | 10/1966 | Gjerde | |
| 3,313,185 A | 4/1967 | Drake et al. | |
| 3,323,814 A | 6/1967 | Phillips | |
| 3,337,008 A | 8/1967 | Trachte | |
| 3,368,596 A | 2/1968 | Corner | |
| 3,386,322 A | 6/1968 | Stone et al. | |
| 3,439,183 A | 4/1969 | Hurst, Jr | |
| 3,445,835 A | 5/1969 | Fudaley | |
| 3,454,286 A | 7/1969 | Anderson et al. | |
| 3,456,696 A | 7/1969 | Gregory et al. | |
| 3,512,440 A | 5/1970 | Frydmann | |
| 3,540,338 A | 11/1970 | McEwan et al. | |
| 3,547,232 A | 12/1970 | Fergle | |
| 3,554,067 A | 1/1971 | Scutella | |
| 3,565,137 A | 2/1971 | Alsruhe | |
| 3,566,996 A | 3/1971 | Crossman | |
| 3,580,376 A | 5/1971 | Loshbough | |
| 3,581,784 A | 6/1971 | Warrick | |
| 3,593,266 A | 7/1971 | Van Sickle | |
| 3,609,495 A | 9/1971 | Seeselberg | |
| 3,613,748 A | 10/1971 | De Pue | |
| 3,621,894 A | 11/1971 | Niksich | |
| 3,626,796 A | 12/1971 | Pearl | |
| 3,675,444 A | 7/1972 | Whipple | |
| 3,680,609 A | 8/1972 | Menge | |
| 3,688,815 A | 9/1972 | Ridenour | |
| 3,695,116 A | 10/1972 | Baur | |
| 3,696,844 A | 10/1972 | Bernatschek | |
| 3,716,113 A | 2/1973 | Kobayashi et al. | |
| 3,719,103 A | 3/1973 | Streander | |
| 3,739,475 A | 6/1973 | Moore | |
| 3,740,000 A | 6/1973 | Takada | |
| 3,745,546 A | 7/1973 | Struger et al. | |
| 3,749,933 A | 7/1973 | Davidson | |
| 3,772,590 A | 11/1973 | Mikulecky et al. | |
| 3,785,230 A | 1/1974 | Lokey | |
| 3,793,727 A | 2/1974 | Moore | |
| 3,793,915 A | 2/1974 | Hujer | |
| 3,829,850 A | 8/1974 | Guetersloh | |
| 3,829,970 A | 8/1974 | Anderson | |
| 3,841,188 A | 10/1974 | Wiater | |
| 3,858,095 A | 12/1974 | Friemann et al. | |
| 3,861,016 A | 1/1975 | Johnson et al. | |
| 3,863,208 A | 1/1975 | Balban | |
| 3,882,744 A | 5/1975 | McCarroll | |
| 3,886,413 A | 5/1975 | Dow et al. | |
| 3,922,785 A | 12/1975 | Fushiya | |
| 3,924,688 A | 12/1975 | Cooper et al. | |
| 3,931,727 A | 1/1976 | Luenser | |
| 3,935,777 A | 2/1976 | Bassett | |
| 3,945,286 A | 3/1976 | Smith | |
| 3,946,631 A | 3/1976 | Malm | |
| 3,947,734 A | 3/1976 | Fyler | |
| 3,953,770 A | 4/1976 | Hayashi | |
| 3,960,310 A | 6/1976 | Nussbaum | |

(56) References Cited

U.S. PATENT DOCUMENTS

| | | |
|---|---|---|
| 3,967,161 A | 6/1976 | Lichtblau |
| 3,970,178 A | 7/1976 | Densow |
| 3,974,565 A | 8/1976 | Ellis |
| 3,975,600 A * | 8/1976 | Marston .................... 379/21 |
| 3,978,624 A | 9/1976 | Merkel et al. |
| 3,994,192 A | 11/1976 | Faig |
| 3,998,121 A | 12/1976 | Bennett |
| 4,007,679 A | 2/1977 | Edwards |
| 4,016,490 A | 4/1977 | Weckenmann et al. |
| 4,026,177 A | 5/1977 | Lokey |
| 4,029,159 A | 6/1977 | Nymann |
| 4,047,156 A | 9/1977 | Atkins |
| 4,060,160 A | 11/1977 | Lieber |
| 4,070,940 A | 1/1978 | McDaniel et al. |
| 4,074,602 A | 2/1978 | Brower |
| 4,075,961 A | 2/1978 | Harris |
| 4,077,161 A | 3/1978 | Wyle et al. |
| 4,085,303 A | 4/1978 | McIntyre et al. |
| 4,090,345 A | 5/1978 | Harkness |
| 4,091,698 A | 5/1978 | Obear et al. |
| 4,106,378 A | 8/1978 | Kaiser |
| 4,117,752 A | 10/1978 | Yoneda |
| 4,119,864 A | 10/1978 | Petrizio |
| 4,145,940 A | 3/1979 | Woloveke et al. |
| 4,152,833 A | 5/1979 | Phillips |
| 4,161,649 A | 7/1979 | Klos et al. |
| 4,175,452 A | 11/1979 | Idel |
| 4,184,394 A | 1/1980 | Gjerde |
| 4,190,000 A | 2/1980 | Shaull et al. |
| 4,195,722 A | 4/1980 | Anderson et al. |
| 4,199,930 A | 4/1980 | Lebet et al. |
| 4,206,666 A | 6/1980 | Ashton |
| 4,206,910 A | 6/1980 | Biesemeyer |
| 4,249,117 A | 2/1981 | Leukhardt et al. |
| 4,249,442 A | 2/1981 | Fittery |
| 4,262,278 A | 4/1981 | Howard et al. |
| 4,267,914 A | 5/1981 | Saar |
| 4,270,427 A | 6/1981 | Colberg et al. |
| 4,276,459 A | 6/1981 | Willett et al. |
| 4,276,799 A | 7/1981 | Muehling |
| 4,291,794 A | 9/1981 | Bauer |
| 4,302,879 A | 12/1981 | Murray |
| 4,305,442 A | 12/1981 | Currie |
| 4,319,146 A | 3/1982 | Wires, Sr. |
| 4,321,841 A | 3/1982 | Felix |
| 4,334,450 A | 6/1982 | Benuzzi |
| 4,351,423 A | 9/1982 | Rogier |
| 4,370,810 A | 2/1983 | Schurr et al. |
| 4,372,202 A | 2/1983 | Cameron |
| 4,372,427 A | 2/1983 | Rogier |
| 4,391,358 A | 7/1983 | Haeger |
| 4,427,042 A | 1/1984 | Mitchell et al. |
| 4,453,112 A | 6/1984 | Sauer et al. |
| 4,466,170 A | 8/1984 | Davis |
| 4,466,233 A | 8/1984 | Thesman |
| 4,470,046 A | 9/1984 | Betsill |
| 4,503,739 A | 3/1985 | Konieczka |
| 4,510,489 A | 4/1985 | Anderson, III et al. |
| 4,512,224 A | 4/1985 | Terauchi |
| 4,516,612 A | 5/1985 | Wiley |
| 4,518,043 A | 5/1985 | Anderson et al. |
| 4,528,488 A | 7/1985 | Susemihl |
| 4,532,501 A | 7/1985 | Hoffman |
| 4,532,844 A | 8/1985 | Chang et al. |
| 4,559,858 A | 12/1985 | Laskowski et al. |
| 4,560,033 A | 12/1985 | DeWoody et al. |
| 4,566,512 A | 1/1986 | Wilson |
| 4,573,556 A | 3/1986 | Andreasson |
| 4,589,047 A | 5/1986 | Gaus et al. |
| 4,589,860 A | 5/1986 | Brandenstein et al. |
| 4,599,597 A | 7/1986 | Rotbart |
| 4,599,927 A | 7/1986 | Eccardt et al. |
| 4,606,251 A | 8/1986 | Boileau |
| 4,617,544 A | 10/1986 | Mooz et al. |
| 4,621,300 A | 11/1986 | Summerer |
| 4,625,406 A | 12/1986 | Fushiya et al. |
| 4,635,364 A | 1/1987 | Noll et al. |
| 4,637,188 A | 1/1987 | Crothers |
| 4,637,289 A | 1/1987 | Ramsden |
| 4,641,557 A | 2/1987 | Steiner et al. |
| 4,657,428 A | 4/1987 | Wiley |
| 4,661,797 A | 4/1987 | Schmall |
| 4,672,500 A | 6/1987 | Tholome et al. |
| 4,675,664 A | 6/1987 | Cloutier et al. |
| 4,679,719 A | 7/1987 | Kramer |
| 4,683,660 A | 8/1987 | Schurr |
| 4,694,721 A | 9/1987 | Brickner, Jr. |
| 4,722,021 A | 1/1988 | Hornung et al. |
| 4,751,603 A | 6/1988 | Kwan |
| 4,756,220 A | 7/1988 | Olsen et al. |
| 4,757,881 A | 7/1988 | Jonsson et al. |
| 4,774,866 A | 10/1988 | Dehari et al. |
| 4,792,965 A | 12/1988 | Morgan |
| 4,805,504 A | 2/1989 | Fushiya et al. |
| 4,831,279 A | 5/1989 | Ingraham |
| 4,840,135 A | 6/1989 | Yamauchi |
| 4,845,476 A | 7/1989 | Rangeard et al. |
| 4,864,455 A | 9/1989 | Shimomura et al. |
| 4,896,607 A | 1/1990 | Hall et al. |
| 4,906,962 A | 3/1990 | Duimstra |
| 4,907,679 A | 3/1990 | Menke |
| 4,934,233 A | 6/1990 | Brundage et al. |
| 4,936,876 A | 6/1990 | Reyes |
| 4,937,554 A | 6/1990 | Herman |
| 4,962,685 A | 10/1990 | Hagstrom |
| 4,964,450 A | 10/1990 | Hughes et al. |
| 4,965,909 A | 10/1990 | McCullough et al. |
| 4,975,798 A | 12/1990 | Edwards et al. |
| 5,020,406 A | 6/1991 | Sasaki et al. |
| 5,025,175 A | 6/1991 | Dubois, III |
| 5,040,444 A | 8/1991 | Shiotani et al. |
| 5,042,348 A | 8/1991 | Brundage et al. |
| 5,046,426 A | 9/1991 | Julien et al. |
| 5,052,255 A | 10/1991 | Gaines |
| 5,074,047 A | 12/1991 | King |
| 5,081,406 A | 1/1992 | Hughes et al. |
| 5,082,316 A | 1/1992 | Wardlaw |
| 5,083,973 A | 1/1992 | Townsend |
| 5,086,890 A | 2/1992 | Turczyn et al. |
| 5,094,000 A | 3/1992 | Becht et al. |
| 5,103,940 A | 4/1992 | Meneut et al. |
| 5,116,249 A | 5/1992 | Shiotani et al. |
| 5,119,555 A | 6/1992 | Johnson |
| 5,122,091 A | 6/1992 | Townsend |
| 5,123,317 A | 6/1992 | Barnes, Jr. et al. |
| 5,125,160 A | 6/1992 | Gassen |
| 5,129,300 A | 7/1992 | Kawakami |
| 5,148,053 A | 9/1992 | Dubois, III |
| 5,163,334 A | 11/1992 | Li et al. |
| 5,184,534 A | 2/1993 | Lee |
| 5,198,702 A | 3/1993 | McCullough et al. |
| 5,199,343 A | 4/1993 | OBanion |
| 5,201,110 A | 4/1993 | Bane |
| 5,201,684 A | 4/1993 | DeBois, III |
| 5,205,069 A | 4/1993 | Shapiro |
| 5,206,625 A | 4/1993 | Davis |
| 5,207,253 A | 5/1993 | Hoshino et al. |
| 5,212,621 A | 5/1993 | Panter |
| 5,218,189 A | 6/1993 | Hutchison |
| 5,230,269 A | 7/1993 | Shiotani et al. |
| 5,231,359 A | 7/1993 | Masuda et al. |
| 5,239,978 A * | 8/1993 | Plangetis .................... 125/16.01 |
| 5,245,879 A | 9/1993 | McKeon |
| 5,257,570 A | 11/1993 | Shiotani et al. |
| 5,265,510 A | 11/1993 | Hoyer-Ellefsen |
| 5,272,946 A | 12/1993 | McCullough et al. |
| 5,276,431 A | 1/1994 | Piccoli et al. |
| 5,285,708 A | 2/1994 | Bosten et al. |
| 5,287,779 A | 2/1994 | Metzger, Jr. |
| 5,293,802 A | 3/1994 | Shiotani et al. |
| 5,320,382 A | 6/1994 | Goldstein et al. |
| 5,321,230 A | 6/1994 | Shanklin et al. |
| 5,331,875 A | 7/1994 | Mayfield |
| 5,353,670 A | 10/1994 | Metzger, Jr. |

(56) References Cited

U.S. PATENT DOCUMENTS

| | | |
|---|---|---|
| 5,375,495 A | 12/1994 | Bosten et al. |
| 5,377,554 A | 1/1995 | Reulein et al. |
| 5,377,571 A | 1/1995 | Josephs |
| 5,392,568 A | 2/1995 | Howard, Jr. et al. |
| 5,392,678 A | 2/1995 | Sasaki et al. |
| 5,401,928 A | 3/1995 | Kelley |
| 5,411,221 A | 5/1995 | Collins et al. |
| 5,422,551 A | 6/1995 | Takeda et al. |
| 5,423,232 A | 6/1995 | Miller et al. |
| 5,436,613 A | 7/1995 | Ghosh et al. |
| 5,447,085 A | 9/1995 | Gochnauer |
| 5,451,750 A | 9/1995 | An |
| 5,453,903 A * | 9/1995 | Chow .......................... 361/79 |
| 5,471,888 A | 12/1995 | McCormick |
| 5,480,009 A | 1/1996 | Wieland et al. |
| 5,503,059 A | 4/1996 | Pacholok |
| 5,510,587 A | 4/1996 | Reiter |
| 5,510,685 A | 4/1996 | Grasselli |
| 5,531,147 A | 7/1996 | Serban |
| 5,534,836 A | 7/1996 | Schenkel et al. |
| 5,592,353 A | 1/1997 | Shinohara et al. |
| 5,606,889 A | 3/1997 | Bielinski et al. |
| 5,619,896 A | 4/1997 | Chen |
| 5,623,860 A | 4/1997 | Schoene et al. |
| 5,647,258 A | 7/1997 | Brazell et al. |
| 5,648,644 A | 7/1997 | Nagel |
| 5,659,454 A | 8/1997 | Vermesse |
| 5,667,152 A | 9/1997 | Mooring |
| 5,671,633 A | 9/1997 | Wagner |
| 5,695,306 A | 12/1997 | Nygren, Jr. |
| 5,700,165 A | 12/1997 | Harris et al. |
| 5,720,213 A | 2/1998 | Sberveglieri |
| 5,722,308 A | 3/1998 | Ceroll et al. |
| 5,724,875 A | 3/1998 | Meredith et al. |
| 5,730,165 A | 3/1998 | Philipp |
| 5,741,048 A | 4/1998 | Eccleston |
| 5,755,148 A | 5/1998 | Stumpf et al. |
| 5,768,786 A | 6/1998 | Kane et al. |
| 5,771,742 A | 6/1998 | Bokaie et al. |
| 5,782,001 A | 7/1998 | Gray |
| 5,787,779 A | 8/1998 | Garuglieri |
| 5,791,057 A | 8/1998 | Nakamura et al. |
| 5,791,223 A | 8/1998 | Lanzer |
| 5,791,224 A | 8/1998 | Suzuki et al. |
| 5,791,441 A | 8/1998 | Matos et al. |
| 5,797,307 A | 8/1998 | Horton |
| 5,819,619 A | 10/1998 | Miller et al. |
| 5,819,625 A | 10/1998 | Sberveglieri |
| 5,852,951 A | 12/1998 | Santi |
| 5,857,507 A | 1/1999 | Puzio et al. |
| 5,861,809 A | 1/1999 | Eckstein et al. |
| 5,880,954 A | 3/1999 | Thomson et al. |
| 5,921,367 A | 7/1999 | Kashioka et al. |
| 5,927,171 A | 7/1999 | Sasaki et al. |
| 5,927,857 A | 7/1999 | Ceroll et al. |
| 5,930,096 A | 7/1999 | Kim |
| 5,937,720 A | 8/1999 | Itzov |
| 5,942,975 A | 8/1999 | Sorensen |
| 5,943,932 A | 8/1999 | Sberveglieri |
| 5,950,514 A | 9/1999 | Benedict et al. |
| 5,963,173 A | 10/1999 | Lian et al. |
| 5,974,927 A | 11/1999 | Tsune |
| 6,009,782 A | 1/2000 | Tajima et al. |
| 6,018,284 A | 1/2000 | Rival et al. |
| 6,037,729 A | 3/2000 | Woods et al. |
| 6,052,884 A | 4/2000 | Steckler et al. |
| 6,062,121 A | 5/2000 | Ceroll et al. |
| 6,070,484 A | 6/2000 | Sakamaki |
| 6,095,092 A | 8/2000 | Chou |
| 6,112,785 A | 9/2000 | Yu |
| 6,119,984 A | 9/2000 | Devine |
| 6,133,818 A | 10/2000 | Hsieh et al. |
| 6,141,192 A | 10/2000 | Garzon |
| 6,148,504 A | 11/2000 | Schmidt et al. |
| 6,148,703 A | 11/2000 | Ceroll et al. |
| 6,150,826 A | 11/2000 | Hokodate et al. |
| 6,161,459 A | 12/2000 | Ceroll et al. |
| 6,236,177 B1 | 5/2001 | Zick et al. |
| 6,244,149 B1 | 6/2001 | Ceroll et al. |
| 6,250,190 B1 | 6/2001 | Ceroll et al. |
| 6,257,061 B1 | 7/2001 | Nonoyama et al. |
| 6,283,002 B1 | 9/2001 | Chiang |
| 6,325,195 B1 | 12/2001 | Doherty |
| 6,330,848 B1 | 12/2001 | Nishio et al. |
| 6,336,273 B1 | 1/2002 | Nilsson et al. |
| 6,352,137 B1 | 3/2002 | Stegall et al. |
| 6,357,328 B1 | 3/2002 | Ceroll et al. |
| 6,366,099 B1 | 4/2002 | Reddi |
| 6,376,939 B1 | 4/2002 | Suzuki et al. |
| 6,404,098 B1 | 6/2002 | Kayama et al. |
| 6,418,829 B1 | 7/2002 | Pilchowski |
| 6,420,814 B1 | 7/2002 | Bobbio |
| 6,427,570 B1 | 8/2002 | Miller et al. |
| 6,430,007 B1 | 8/2002 | Jabbari |
| 6,431,425 B1 | 8/2002 | Moorman et al. |
| 6,450,077 B1 | 9/2002 | Ceroll et al. |
| 6,453,786 B1 | 9/2002 | Ceroll et al. |
| 6,460,442 B2 | 10/2002 | Talesky et al. |
| 6,471,106 B1 | 10/2002 | Reining |
| 6,479,958 B1 | 11/2002 | Thompson et al. |
| 6,484,614 B1 | 11/2002 | Huang |
| D466,913 S | 12/2002 | Ceroll et al. |
| 6,492,802 B1 | 12/2002 | Bielski |
| D469,354 S | 1/2003 | Curtsinger |
| 6,530,303 B1 | 3/2003 | Parks et al. |
| 6,536,536 B1 | 3/2003 | Gass et al. |
| 6,543,324 B2 | 4/2003 | Dils |
| 6,546,835 B2 | 4/2003 | Wang |
| 6,564,909 B1 | 5/2003 | Razzano |
| 6,575,067 B2 | 6/2003 | Parks et al. |
| 6,578,856 B2 | 6/2003 | Kahle |
| 6,581,655 B2 | 6/2003 | Huang |
| 6,595,096 B2 | 7/2003 | Ceroll et al. |
| D478,917 S | 8/2003 | Ceroll et al. |
| 6,601,493 B1 | 8/2003 | Crofutt |
| 6,607,015 B1 | 8/2003 | Chen |
| D479,538 S | 9/2003 | Welsh et al. |
| 6,617,720 B1 | 9/2003 | Egan, III et al. |
| 6,619,348 B2 | 9/2003 | Wang |
| 6,640,683 B2 | 11/2003 | Lee |
| 6,644,157 B2 | 11/2003 | Huang |
| 6,647,847 B2 | 11/2003 | Hewitt et al. |
| 6,659,233 B2 | 12/2003 | DeVlieg |
| 6,684,750 B2 | 2/2004 | Yu |
| 6,713,980 B2 | 3/2004 | Mukai et al. |
| 6,722,242 B2 | 4/2004 | Chuang |
| 6,734,581 B1 | 5/2004 | Griffis |
| 6,736,042 B2 | 5/2004 | Behne et al. |
| 6,742,430 B2 | 6/2004 | Chen |
| 6,796,208 B1 | 9/2004 | Jorgensen |
| 6,800,819 B2 | 10/2004 | Sato et al. |
| 6,813,983 B2 | 11/2004 | Gass et al. |
| 6,826,988 B2 | 12/2004 | Gass et al. |
| 6,826,992 B1 | 12/2004 | Huang |
| 6,840,144 B2 | 1/2005 | Huang |
| 6,854,371 B2 | 2/2005 | Yu |
| 6,857,345 B2 | 2/2005 | Gass et al. |
| 6,874,397 B2 | 4/2005 | Chang |
| 6,874,399 B2 | 4/2005 | Lee |
| 6,877,410 B2 | 4/2005 | Gass et al. |
| 6,880,440 B2 | 4/2005 | Gass et al. |
| 6,889,585 B1 | 5/2005 | Harris et al. |
| 6,900,728 B2 | 5/2005 | Metzger, Jr. |
| 6,920,814 B2 | 7/2005 | Gass et al. |
| 6,922,153 B2 | 7/2005 | Pierga et al. |
| 6,945,148 B2 | 9/2005 | Gass et al. |
| 6,945,149 B2 | 9/2005 | Gass et al. |
| 6,957,601 B2 | 10/2005 | Gass et al. |
| 6,968,767 B2 | 11/2005 | Yu |
| 6,986,370 B1 | 1/2006 | Schoene et al. |
| 6,994,004 B2 | 2/2006 | Gass et al. |
| 6,997,090 B2 | 2/2006 | Gass et al. |
| 7,000,514 B2 | 2/2006 | Gass et al. |
| 7,024,975 B2 | 4/2006 | Gass et al. |

(56) References Cited

U.S. PATENT DOCUMENTS

| | | |
|---|---|---|
| 7,047,854 B2 | 5/2006 | Sako |
| 7,055,417 B1 | 6/2006 | Gass |
| 7,077,039 B2 | 7/2006 | Gass et al. |
| 7,098,800 B2 | 8/2006 | Gass |
| 7,100,483 B2 | 9/2006 | Gass et al. |
| 7,137,326 B2 | 11/2006 | Gass et al. |
| 7,171,879 B2 | 2/2007 | Gass et al. |
| 7,197,969 B2 | 4/2007 | Gass et al. |
| 7,210,383 B2 | 5/2007 | Gass et al. |
| 7,225,712 B2 | 6/2007 | Gass et al. |
| 7,228,772 B2 | 6/2007 | Gass |
| 7,231,856 B2 | 6/2007 | Gass et al. |
| 7,267,038 B2 | 9/2007 | Parks et al. |
| 7,284,467 B2 | 10/2007 | Gass et al. |
| 7,290,472 B2 | 11/2007 | Gass et al. |
| 7,308,843 B2 | 12/2007 | Gass et al. |
| 7,347,131 B2 | 3/2008 | Gass |
| 7,350,444 B2 | 4/2008 | Gass et al. |
| 7,350,445 B2 | 4/2008 | Gass et al. |
| 7,353,737 B2 | 4/2008 | Gass et al. |
| 7,357,056 B2 | 4/2008 | Gass et al. |
| 7,359,174 B2 | 4/2008 | Gass |
| 7,373,863 B2 | 5/2008 | O'Banion et al. |
| 7,377,199 B2 | 5/2008 | Gass et al. |
| 7,421,315 B2 | 9/2008 | Gass et al. |
| 7,458,301 B2 | 12/2008 | Yu |
| 7,472,634 B2 | 1/2009 | Gass et al. |
| 7,481,140 B2 | 1/2009 | Gass et al. |
| 7,509,899 B2 | 3/2009 | Gass et al. |
| 7,525,055 B2 | 4/2009 | Gass et al. |
| 7,536,238 B2 | 5/2009 | Gass |
| 7,591,210 B2 | 9/2009 | Gass et al. |
| 7,600,455 B2 | 10/2009 | Gass et al. |
| 7,610,836 B2 | 11/2009 | Gass et al. |
| 7,617,752 B2 | 11/2009 | Gass et al. |
| 7,621,205 B2 | 11/2009 | Gass |
| 7,640,835 B2 | 1/2010 | Gass |
| 7,640,837 B2 | 1/2010 | Gass et al. |
| 7,644,645 B2 | 1/2010 | Gass et al. |
| 7,661,343 B2 | 2/2010 | Gass et al. |
| 7,681,479 B2 | 3/2010 | Gass et al. |
| 7,685,912 B2 | 3/2010 | Gass et al. |
| 7,698,976 B2 | 4/2010 | Gass |
| 7,707,918 B2 | 5/2010 | Gass et al. |
| 7,707,920 B2 | 5/2010 | Gass et al. |
| 7,712,403 B2 | 5/2010 | Gass et al. |
| 7,721,633 B2 | 5/2010 | Gaw |
| 7,784,507 B2 | 8/2010 | Gass et al. |
| 7,788,999 B2 | 9/2010 | Gass et al. |
| 7,789,002 B2 | 9/2010 | Gass et al. |
| 7,827,890 B2 | 11/2010 | Gass et al. |
| 7,827,893 B2 | 11/2010 | Gass et al. |
| 7,832,314 B2 | 11/2010 | Gass |
| 7,836,804 B2 | 11/2010 | Gass |
| 7,845,258 B2 | 12/2010 | Gass et al. |
| 7,866,239 B2 | 1/2011 | Gass et al. |
| 7,895,927 B2 | 3/2011 | Gass |
| 7,895,929 B2 | 3/2011 | Zhang et al. |
| 7,900,541 B2 | 3/2011 | Gass et al. |
| 7,908,950 B2 | 3/2011 | Gass et al. |
| 7,921,754 B2 | 4/2011 | Gass et al. |
| 7,958,806 B2 | 6/2011 | Gass et al. |
| 7,971,613 B2 | 7/2011 | Gass et al. |
| 7,991,503 B2 | 8/2011 | Gass |
| 7,997,176 B2 | 8/2011 | Gass et al. |
| 8,006,595 B2 | 8/2011 | Gass |
| 8,011,279 B2 | 9/2011 | Gass et al. |
| 8,051,758 B2 | 11/2011 | Eppard |
| 8,051,759 B2 | 11/2011 | Gass et al. |
| 8,061,245 B2 | 11/2011 | Gass |
| 8,061,246 B2 | 11/2011 | Gass et al. |
| 8,065,943 B2 | 11/2011 | Gass et al. |
| 8,079,292 B2 | 12/2011 | Gass et al. |
| 8,079,295 B2 | 12/2011 | Gass |
| 8,087,438 B2 | 1/2012 | Gass |
| 8,100,039 B2 | 1/2012 | Gass |
| 8,122,798 B1 | 2/2012 | Shafer et al. |
| 8,122,807 B2 | 2/2012 | Gass et al. |
| 8,151,675 B2 | 4/2012 | Gass et al. |
| 8,186,255 B2 | 5/2012 | Gass et al. |
| 8,186,256 B2 | 5/2012 | Carrier |
| 8,191,450 B2 | 6/2012 | Gass |
| 8,196,499 B2 | 6/2012 | Gass |
| 8,246,059 B2 | 8/2012 | Gass et al. |
| 8,266,997 B2 | 9/2012 | Gass et al. |
| 8,291,797 B2 | 10/2012 | Gass et al. |
| 8,297,159 B2 | 10/2012 | Voruganti et al. |
| 8,316,547 B2 | 11/2012 | Hecht et al. |
| 8,336,432 B1 | 12/2012 | Butler |
| 8,371,196 B2 | 2/2013 | Gass et al. |
| 8,402,869 B2 | 3/2013 | Gass et al. |
| 8,408,106 B2 | 4/2013 | Gass |
| 8,413,559 B2 | 4/2013 | Gass |
| 8,430,005 B2 | 4/2013 | Gass et al. |
| 8,438,958 B2 | 5/2013 | Gass et al. |
| 8,459,157 B2 | 6/2013 | Gass et al. |
| 8,469,067 B2 | 6/2013 | Gass et al. |
| 8,489,223 B2 | 7/2013 | Gass |
| 8,490,527 B2 | 7/2013 | Gass et al. |
| 8,498,732 B2 | 7/2013 | Gass |
| 8,505,424 B2 | 8/2013 | Gass et al. |
| 8,511,693 B2 | 8/2013 | Gass et al. |
| 8,522,655 B2 | 9/2013 | Gass et al. |
| 8,534,174 B2 | 9/2013 | Kdita et al. |
| 8,646,369 B2 | 2/2014 | Gass et al. |
| 8,689,665 B2 | 4/2014 | Winkler |
| 8,925,433 B2 | 1/2015 | Stellmann |
| 8,935,000 B2 | 1/2015 | Krapf et al. |
| 8,943,937 B2 | 2/2015 | Haldar et al. |
| 9,038,515 B2 | 5/2015 | Gass |
| 9,522,476 B2 | 12/2016 | Gass |
| 9,555,491 B2 | 1/2017 | Gass et al. |
| 9,586,335 B2 | 3/2017 | Tsuda et al. |
| 9,623,498 B2 | 4/2017 | Gass et al. |
| 2001/0032534 A1 | 10/2001 | Ceroll et al. |
| 2002/0017175 A1 | 2/2002 | Gass et al. |
| 2002/0017176 A1 | 2/2002 | Gass et al. |
| 2002/0017178 A1 | 2/2002 | Gass et al. |
| 2002/0017179 A1 | 2/2002 | Gass et al. |
| 2002/0017180 A1 | 2/2002 | Gass et al. |
| 2002/0017181 A1 | 2/2002 | Gass et al. |
| 2002/0017182 A1 | 2/2002 | Gass et al. |
| 2002/0017183 A1 | 2/2002 | Gass et al. |
| 2002/0017184 A1 | 2/2002 | Gass et al. |
| 2002/0017336 A1 | 2/2002 | Gass et al. |
| 2002/0020261 A1 | 2/2002 | Gass et al. |
| 2002/0020262 A1 | 2/2002 | Gass et al. |
| 2002/0020263 A1 | 2/2002 | Gass et al. |
| 2002/0020265 A1 | 2/2002 | Gass et al. |
| 2002/0020271 A1 | 2/2002 | Gass et al. |
| 2002/0043776 A1 | 4/2002 | Chuang |
| 2002/0050201 A1 | 5/2002 | Lane et al. |
| 2002/0056348 A1 | 5/2002 | Gass et al. |
| 2002/0056349 A1 | 5/2002 | Gass et al. |
| 2002/0056350 A1 | 5/2002 | Gass et al. |
| 2002/0059853 A1 | 5/2002 | Gass et al. |
| 2002/0059854 A1 | 5/2002 | Gass et al. |
| 2002/0059855 A1 | 5/2002 | Gass et al. |
| 2002/0066346 A1 | 6/2002 | Gass et al. |
| 2002/0069734 A1 | 6/2002 | Gass et al. |
| 2002/0109036 A1 | 8/2002 | Denen et al. |
| 2002/0170399 A1 | 11/2002 | Gass et al. |
| 2003/0000359 A1 | 1/2003 | Eccardt et al. |
| 2003/0005588 A1 | 1/2003 | Gass et al. |
| 2003/0019341 A1 | 1/2003 | Gass et al. |
| 2003/0020336 A1 | 1/2003 | Gass et al. |
| 2003/0037651 A1 | 2/2003 | Gass et al. |
| 2003/0037655 A1 | 2/2003 | Chin-Chin |
| 2003/0056853 A1 | 3/2003 | Gass et al. |
| 2003/0074873 A1 | 4/2003 | Freiberg et al. |
| 2003/0089212 A1 | 5/2003 | Parks et al. |
| 2003/0109798 A1 | 6/2003 | Kermani |
| 2003/0193400 A1 | 10/2003 | Grasselli et al. |
| 2004/0011177 A1 | 1/2004 | Huang |

(56) References Cited

U.S. PATENT DOCUMENTS

| | | |
|---|---|---|
| 2004/0060404 A1 | 4/2004 | Metzger, Jr. |
| 2004/0104085 A1 | 6/2004 | Lang et al. |
| 2004/0123709 A1 | 7/2004 | Metzger, Jr. |
| 2004/0159198 A1 | 8/2004 | Peot et al. |
| 2004/0194594 A1 | 10/2004 | Dils et al. |
| 2004/0200329 A1 | 10/2004 | Sako |
| 2004/0226424 A1 | 11/2004 | O'Banion et al. |
| 2004/0226800 A1 | 11/2004 | Pierga et al. |
| 2004/0255745 A1 | 12/2004 | Peot et al. |
| 2005/0057206 A1 | 3/2005 | Uneyama |
| 2005/0092149 A1 | 5/2005 | Hartmann |
| 2005/0139051 A1 | 6/2005 | Gass et al. |
| 2005/0139056 A1 | 6/2005 | Gass et al. |
| 2005/0139057 A1 | 6/2005 | Gass et al. |
| 2005/0139058 A1 | 6/2005 | Gass et al. |
| 2005/0139459 A1 | 6/2005 | Gass et al. |
| 2005/0145063 A1 | 7/2005 | Voigtlaender |
| 2005/0155473 A1 | 7/2005 | Gass |
| 2005/0166736 A1 | 8/2005 | Gass et al. |
| 2005/0178259 A1 | 8/2005 | Gass et al. |
| 2005/0204885 A1 | 9/2005 | Gass et al. |
| 2005/0211034 A1 | 9/2005 | Sasaki et al. |
| 2005/0235793 A1 | 10/2005 | O'Banion et al. |
| 2005/0268767 A1 | 12/2005 | Pierga et al. |
| 2005/0274432 A1 | 12/2005 | Gass et al. |
| 2006/0000337 A1 | 1/2006 | Gass |
| 2006/0032352 A1 | 2/2006 | Gass et al. |
| 2006/0096425 A1 | 5/2006 | Keller |
| 2006/0197020 A1 | 9/2006 | Trzecieski et al. |
| 2008/0016998 A1 | 1/2008 | Keller |
| 2008/0078470 A1 | 4/2008 | O'Branion et al. |
| 2010/0050843 A1 | 3/2010 | Gass et al. |
| 2010/0307307 A1 | 12/2010 | Butler |
| 2010/0307308 A1 | 12/2010 | Butler |
| 2011/0023674 A1 | 2/2011 | Stasiewicz et al. |
| 2011/0048204 A1 | 3/2011 | Chung |
| 2011/0079124 A1 | 4/2011 | Carrier |
| 2011/0179923 A1 | 7/2011 | Tsuda et al. |
| 2011/0203438 A1 | 8/2011 | Nenadic et al. |
| 2012/0090439 A1 | 4/2012 | Butler |
| 2012/0216665 A1 | 8/2012 | Gass et al. |
| 2014/0150615 A1 | 6/2014 | Pierga et al. |
| 2014/0182430 A1 | 7/2014 | Haldar |
| 2014/0260852 A1 | 9/2014 | Laliberte |
| 2014/0290799 A1 | 10/2014 | Gass |
| 2015/0107427 A1 | 4/2015 | Gass et al. |
| 2015/0107428 A1 | 4/2015 | Burke et al. |
| 2015/0107430 A1 | 4/2015 | Gass et al. |
| 2015/0165641 A1 | 6/2015 | Gass et al. |
| 2015/0273723 A1 | 10/2015 | Gass et al. |
| 2015/0375314 A1 | 12/2015 | Gass et al. |
| 2016/0008997 A1 | 1/2016 | Gass et al. |
| 2016/0016240 A1 | 1/2016 | Koegel |
| 2016/0046034 A1 | 2/2016 | Burke et al. |
| 2016/0082529 A1 | 3/2016 | Gass et al. |
| 2016/0121412 A1 | 5/2016 | Fulmer et al. |
| 2016/0214189 A9 | 7/2016 | Stasiewicz et al. |
| 2016/0243632 A9 | 8/2016 | Fulmer et al. |
| 2016/0346849 A1 | 12/2016 | Gass |
| 2017/0008189 A9 | 1/2017 | Gass et al. |
| 2017/0072481 A1 | 3/2017 | Gass et al. |
| 2017/0072582 A1 | 3/2017 | Gass |
| 2017/0136561 A1 | 5/2017 | Gass et al. |
| 2017/0173818 A1 | 6/2017 | Tsuda et al. |

FOREIGN PATENT DOCUMENTS

| | | |
|---|---|---|
| DE | 76186 | 8/1921 |
| DE | 2227184 | 6/1972 |
| DE | 2917497 | 4/1979 |
| DE | 2800403 | 7/1979 |
| DE | 3427733 | 1/1986 |
| DE | 4235161 A1 | 5/1993 |
| DE | 4326313 | 2/1995 |
| DE | 4334933 A1 | 4/1995 |
| DE | 19612246 A1 | 9/1997 |
| DE | 19609771 | 6/1998 |
| DE | 20102704 | 2/2001 |
| EP | 146460 | 11/1988 |
| EP | 0362937 A2 | 4/1990 |
| EP | 0715934 A1 | 6/1996 |
| EP | 1961525 | 8/2008 |
| ES | 2152184 | 1/2001 |
| FR | 2187981 | 6/1973 |
| FR | 2556643 | 6/1985 |
| FR | 2570017 | 3/1986 |
| GB | 598204 | 2/1948 |
| GB | 1132708 | 11/1968 |
| GB | 1425378 | 2/1976 |
| GB | 2096844 | 10/1982 |
| GB | 2142571 | 1/1985 |
| IT | 988922 | 6/1973 |
| JP | 60-98605 | 7/1985 |
| JP | 64-2803 | 1/1989 |
| SE | 83283 | 6/1973 |
| WO | WO 86/06816 | 11/1986 |
| WO | WO 90/01670 | 2/1990 |
| WO | WO 96/22175 | 7/1996 |
| WO | WO 97/12174 | 4/1997 |
| WO | WO 01/26064 | 4/2001 |
| WO | WO 11/040957 | 4/2011 |

OTHER PUBLICATIONS

U.S. Appl. No. 60/182,866, filed Feb. 16, 2000, entitled "Fast-Acting Safety Stop."

IWF 2000 Challengers Award Official Entry Form, submitted Apr. 26, 2000, 6 pages plus CD (the portions of US patent applications referenced in the form are from U.S. Appl. No. 60/157,340, filed Oct. 1, 1999 and U.S. Appl. No. 60/182,866, filed Feb. 16, 2000).

Gordon Engineering Corp., Product Catalog, Oct. 1997, pp. cover, 1, 3 and back, Brookfield, Connecticut, US.

Analog Devices, Inc., 3-Axis Capacitive Sensor—Preliminary Technical Data AD7103, pp. 1-44, © 1998.

Skil Model 3400—Type 1 10" Table Saw Parts List and Technical Bulletin, S-B Power Tool Company, Jun. 1993.

Shop Fox® Fence Operating Manual, Woodstock International, Inc., 1996, revised May 1997.

Excaliber T-Slot Precision Saw Fence Model TT45 Owner's Manual, Sommerville Design & Manufacturing, Inc., May 2000.

Bosch Model 4000 Worksite Table Saw Operating/Safety Instructions, S-B Power Tool Company, Jul. 2000.

XACTA Fence II™ Homeshop 30/52 Owner's Manual, JET Equipment & Tools, Mar. 2001.

XACTA Fence II™ Commercial 30/50 Owner's Manual, JET Equipment & Tools, Mar. 2001.

Bosch 10" Table Saw Model 0601476139 Parts List and Technical Bulletin, S-B Power Tool Company, Apr. 2001.

Biesemeyer® T-Square® Universal Home Shop Fence system Instruction Manual, Delta Machinery, Jun. 1, 2001.

Powermatic 10" Tilting Arbor Saw Model 66 Instruction Manual & Parts List, Jet Equipment & Tools, Jun. 2001.

Skil Model 3400 Table Saw Operating/Safety Instructions, S-B Power Tool Company, Sep. 2001.

The Merlin Splitter by Excalibur a Sommerville Design Product Overview & Generic Installation Notes, Sommerville Design & Manufacturing Inc., at least as early as 2002.

INCRA Incremental Micro Precision Table Saw Fence Owner's Manual, Taylor Design Group, Inc., 2003.

Shop Fox® Models W2005, W2006, W2007 Classic Fence Instruction Manual, Woodstock International, Jan. 2000, revised Mar. 2004.

ACCU-FENCE® 64A Fence and Rail System Owner's Manual, WMH Tool Group, Sep. 2004.

Unifence™ Saw Guide Instruction Manual, Delta Machinery, Feb. 22, 2005.

Biesemeyer® T-Square® Commercial Fence System Instruction Manual, Delta Machinery, May 2, 2005.

Laguna Tools table saw owner's manual, date unknown.

(56) References Cited

OTHER PUBLICATIONS

*You Should Have Invented It*, French television show video.
Sears Owners Manual Model No. 113.299131, Dec. 1973.
Elmshorn Student Wins for the Seconds Time at Jugend Forscht, Hamburg Morning News, May 5, 1997.
Active Safety System on a Table Saw, Jan Nieberle & Sebastian Hauer, 1997 Workplace Bavaria.
Grizzly Industrial, Inc. Heavy-Duty 12" Table Saw Model G5959 and G9957 Parts List, 1998 and Oct. 2001.
OSHA: A Guide for Protecting Workers from Woodworking Hazards, 1999.
Pictures of SawStop Prototype Cabinet Saw, May 2002.
Young Inventor: Teen's Device Earns Her Trip to Science Fair, The Arizona Republic, May 5, 2006.
Grizzly Industrial, Inc. Model G0605X/G0606X Extreme Series 12" Table Saw Owner's Manual, Grizzly Industrial, Inc., Oct. 2006.
Grizzly Industrial, Inc. Model G0651/G0652 10" Extreme Series Table Saws Owner's Manual, Grizzly Industrial, Inc., Mar. 2008.
Memorandum Opinion, Findings of Fact, and Conclusions of Law, *SD3, LLC* v. *Michelle K. Lee*, Civil Case No. 08-CV-1242, filed Aug. 31, 2016.
Operator Injury Mitigation Using Electronic Sensing and Mechanical Braking and Decoupling Devices in Handheld Circular Saws, Erin F. Eppard, date unknown.

\* cited by examiner

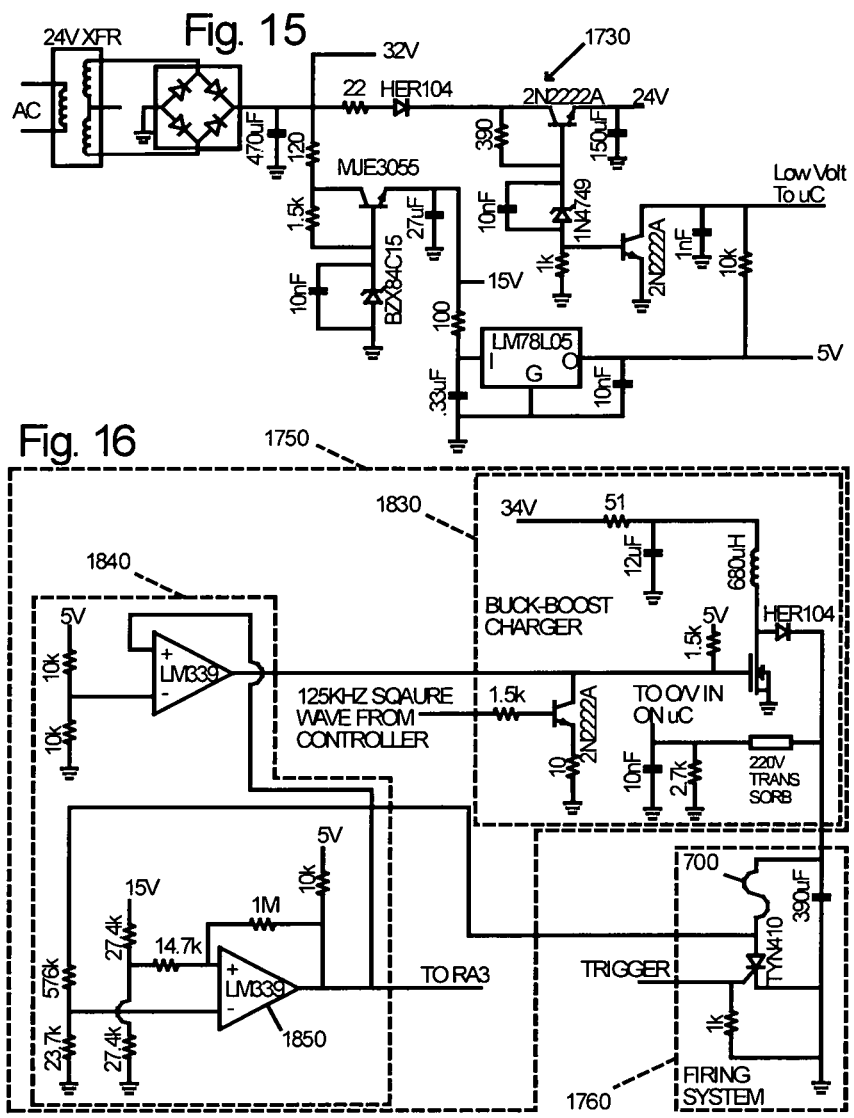

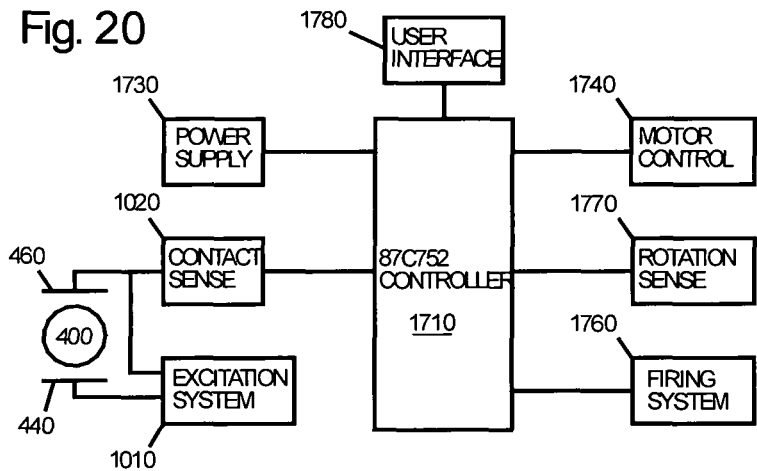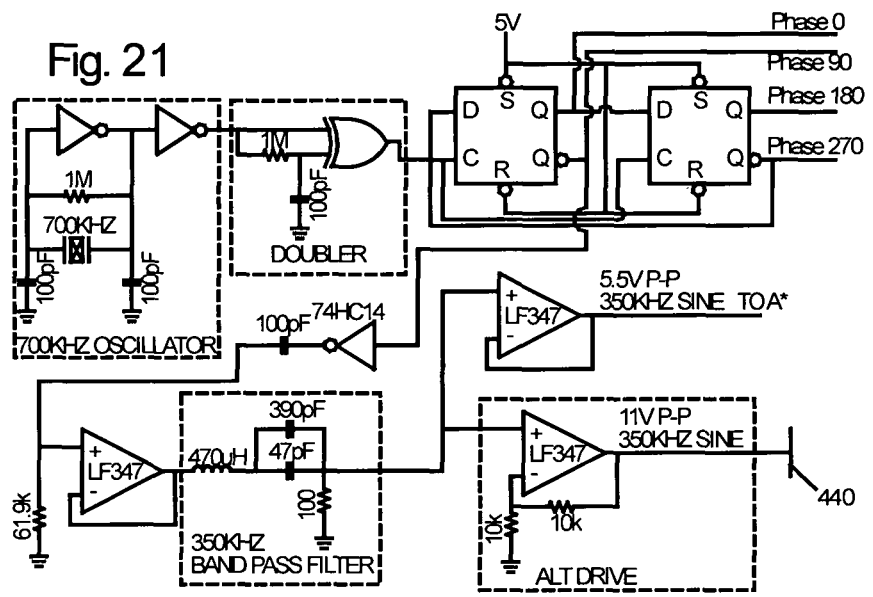

BAND SAW WITH IMPROVED SAFETY SYSTEM

CROSS-REFERENCE TO RELATED APPLICATIONS

This application claims the benefit of and priority from the following U.S. Provisional Patent Application, the disclosure of which is herein incorporated by reference: Ser. No. 60/292,100, filed May 17, 2001.

This application hereby incorporates by reference the following U.S. patent application: Ser. No. 09/676,190, filed Sep. 29, 2000.

This application also hereby incorporates by reference the following PCT patent application: PCT/US00/26812, filed Sep. 29, 2000.

This application further incorporates by reference the following U.S. provisional patent applications: Ser. No. 60/157,340, filed Oct. 1, 1999, Ser. No. 60/182,866, filed Feb. 16, 2000, Ser. No. 60/225,056, filed Aug. 14, 2000, Ser. No. 60/225,057, filed Aug. 14, 2000, Ser. No. 60/225,058, filed Aug. 14, 2000, Ser. No. 60/225,059, filed Aug. 14, 2000, Ser. No. 60/225,089, filed Aug. 14, 2000, Ser. No. 60/225,094, filed Aug. 14, 2000, Ser. No. 60/225,169, filed Aug. 14, 2000, Ser. No. 60/225,170, filed Aug. 14, 2000, Ser. No. 60/225,200, filed Aug. 14, 2000, Ser. No. 60/225,201, filed Aug. 14, 2000, Ser. No. 60/225,206, filed Aug. 14, 2000, Ser. No. 60/225,210, filed Aug. 14, 2000, Ser. No. 60/225,211, filed Aug. 14, 2000, Ser. No. 60/225,212, filed Aug. 14, 2000, Ser. No. 60/233,459, filed Sep. 18, 2000, Ser. No. 60/270,011, filed Feb. 20, 2001, Ser. No. 60/270,941, filed Feb. 22, 2001, Ser. No. 60/270,942, filed Feb. 22, 2001, Ser. No. 60/273,178, filed Mar. 2, 2001, Ser. No. 60/273,177, filed Mar. 2, 2001, Ser. No. 60/273,902, filed Mar. 6, 2001, Ser. No. 60/275,594, filed Mar. 13, 2001, Ser. No. 60/275,595, filed Mar. 13, 2001, Ser. No. 60/275,583, filed Mar. 13, 2001, Ser. No. 60/279,313, filed Mar. 27, 2001, and Ser. No. 60/292,081, filed May 17, 2001.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The computer program listing identified herein is subject to copyright protection.

COMPUTER PROGRAM LISTING APPENDIX

Two compact discs, each containing a computer program listing, are submitted herewith as a Computer Program Listing Appendix. The compact discs are identified as "Copy 1" and "Copy 2" and they are identical. The program listing is stored on each compact disc as one ASCII text file entitled "sawbrk". The date of creation of the file is Jun. 29, 2000, and the size of the file is 50 kilobytes. The material on the compact discs is hereby incorporated by reference.

FIELD

The present invention relates to band saws, and more particularly to a band saw with a high-speed safety system.

BACKGROUND

Band saws are a type of woodworking machinery used to cut workpieces of wood, plastic, and other materials. Band saws include two, spaced-apart wheels, and a blade tightly looped around the wheels. The blade is made from a band of metal with teeth on one edge of the band. The blade moves around the wheels when the wheels spin. Band saws also include a table or work surface adjacent the blade and upon which workpieces are placed. A person uses the band saw by placing a workpiece on the table and then sliding the workpiece into the moving blade. Band saws present a risk of injury to users because the blade is exposed when in use. Furthermore, users often must place their hands very close to the blade to position and move workpieces, which increases the chance that an injury will occur.

The present invention provides a band saw with an improved safety system that is adapted to detect the occurrence of one or more dangerous, or triggering, conditions during use of the band saw, such as when a user's body contacts the moving blade. When such a condition occurs, the safety system is actuated to limit or even prevent injury to the user.

BRIEF DESCRIPTION OF THE DRAWINGS

FIG. 15 is a schematic of a power supply of the subsystem of FIG. 11.

FIG. 16 is a schematic of a boost regulator portion and a firing portion of the subsystem of FIG. 11.

FIG. 20 is a block diagram of second and third alternative electronic subsystems.

FIG. 21 is a schematic of an excitation system portion of the subsystems of FIG. 20.

DETAILED DESCRIPTION

Figure 1:
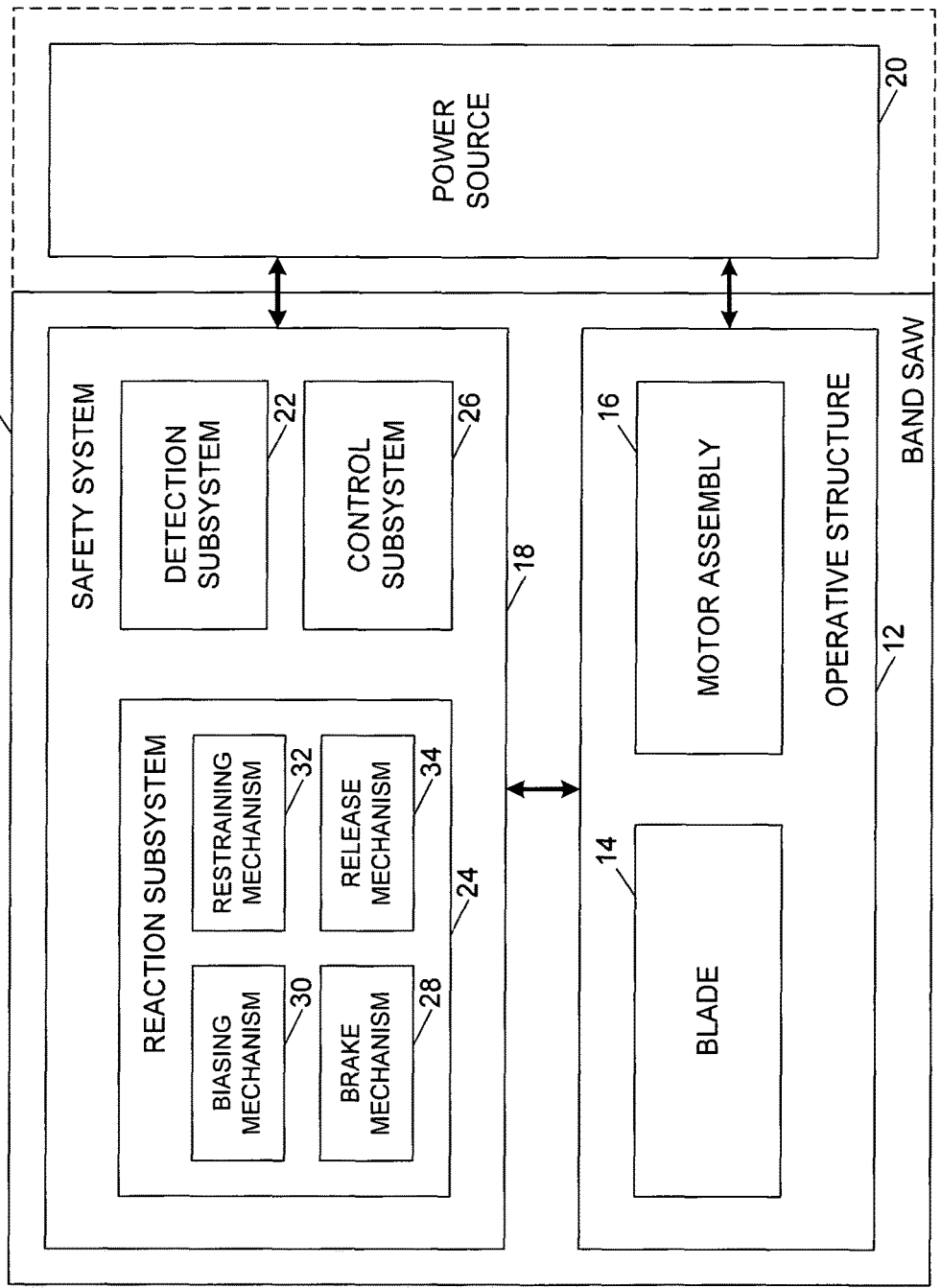
FIG. 1 is a schematic block diagram of a band saw with a fast-acting safety system according to the present invention.

A band saw according to the present invention is shown schematically in FIG. 1 and indicated generally at 10. Band saw 10 may be any of a variety of different types and configurations of band saws adapted for cutting workpieces, such as wood and plastic. Band saw 10 includes an operative structure 12 having a blade 14 and a motor assembly 16 adapted to drive the blade. Band saw 10 also includes a safety system 18 configured to minimize the potential of a serious injury to a person using the band saw. Safety system 18 is adapted to detect the occurrence of one or more dangerous, or triggering, conditions during use of band saw 10. If such a dangerous condition is detected, safety system 18 is adapted to engage operative structure 12 to limit any injury to the user caused by the dangerous condition.

Band saw 10 includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of band saw 10.

It will be appreciated that operative structure 12 may take any one of many different forms, depending on the type of band saw 10. As will be described in more detail below, operative structure 12 typically includes two, spaced-apart wheels and a table adjacent the wheels. A blade 14, made from a band of metal with teeth along one edge of the band, is positioned around the wheels adjacent the table. Motor assembly 16 includes one or more motors adapted to drive blade 14 by spinning at least one of the wheels around which the blade is positioned.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of band saw 10. In addition, control subsystem 26 typically includes one or more instruments operable by a user to control the band saw. The control subsystem is configured to control band saw 10 in response to the inputs it receives.

Detection subsystem 22 is configured to detect one or more dangerous, or triggering, conditions during use of band saw 10. For example, the detection subsystem may be configured to detect that a portion of the user's body is in contact with a portion of blade 14. In some embodiments, detection subsystem 22 may inform control subsystem 26 of the dangerous condition, which then activates reaction subsystem 24. In other embodiments, the detection subsystem may be adapted to activate the reaction subsystem directly. Various exemplary embodiments and implementations of detection subsystem 22 are described in more detail in U.S. Provisional Patent Application Ser. No. 60/225,200, entitled "Contact Detection System for Power Equipment," filed Aug. 14, 2000, by SD3, LLC, the disclosure of which is incorporated herein by reference.

Once activated in response to a dangerous condition, reaction subsystem 24 is configured to quickly engage operative structure 12 to prevent serious injury to the user. It will be appreciated that the particular action to be taken by reaction subsystem 24 will vary depending on the type of band saw 10 and/or the dangerous condition that is detected. For example, reaction subsystem 24 may be configured to do one or more of the following: stop the movement of blade 14 by cutting the blade and/or by gripping the blade, or by retracting the blade from its operating position.

The configuration of reaction subsystem 24 typically will vary depending on which action(s) are taken. In the exemplary embodiment depicted in FIG. 1, reaction subsystem 24 is configured to stop the movement of blade 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of band saw 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the blade to a stop.

Control subsystem 26 includes one or more instruments that are operable by a user to control the motion of blade 14. Those instruments may include start/stop switches, speed controls, etc. Control subsystem 26 typically includes a logic controller connected to receive the user's inputs via the instruments. The logic controller is also connected to receive a contact detection signal from detection subsystem 22. Further, the logic controller may be configured to receive inputs from other sources, such as blade motion sensors, workpiece sensors, etc. In any event, the logic controller is configured to control operative structure 12 in response to the user's inputs. However, upon receipt of a contact detection signal from detection subsystem 22, the logic controller overrides the control inputs from the user and activates reaction subsystem 24 to stop the motion of the blade. Various exemplary embodiments and implementations of control subsystem 26, including the logic controller, are described in more detail in U.S. Provisional Patent Application Ser. No. 60/225,059, entitled "Logic Control For Fast Acting Safety System," filed Aug. 14, 2000 by SD3, LLC, and in U.S. Provisional Patent Application Ser. No. 60/225,094, entitled "Motion Detecting System For Use In Safety System For Power Equipment," filed Aug. 14, 2000 by SD3, LLC, the disclosures of which are herein incorporated by reference.

A computer program listing for a controller as shown in FIG. 1 is submitted herewith as a Computer Program Listing Appendix.

Figure 2:
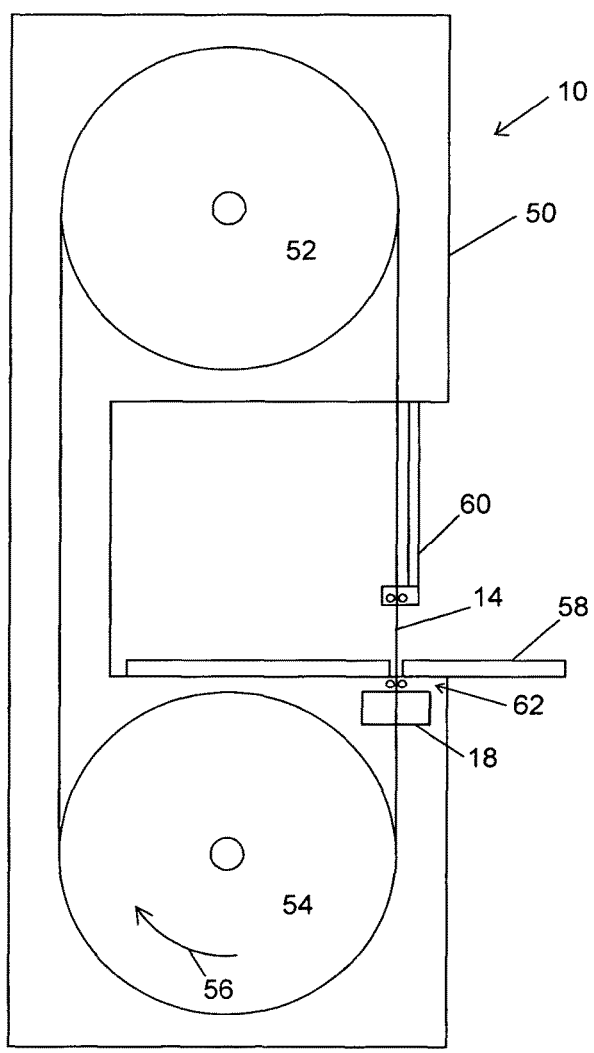
FIG. 2 is a schematic side elevation of an embodiment of a band saw according to the present invention.

One embodiment of band saw 10 is shown specifically in FIG. 2. It includes a main housing 50 enclosing a pair of spaced-apart wheels 52 and 54. Wheels 52 and 54 are supported for rotational movement by housing 50. Housing 50 also typically encloses the wheels to prevent a user from touching them while they are spinning. The perimeter of each wheel may be coated or covered in a high-friction material such as rubber, etc. A relatively thin, continuous loop, tooth-edged blade 14 tightly encircles both wheels. Wheel 54 is driven by motor assembly 16 (not shown in FIG. 2) so that it rotates in the direction of arrow 56. Rotating wheel 54 causes blade 14 to move, which in turn, causes wheel 52 to rotate. Blade 14 moves adjacent table 58. A workpiece is cut by sliding the workpiece on table 58 into the teeth of moving blade 14 between wheels 52 and 54. An upper blade-guide assembly 60 and a lower blade-guide assembly 62 maintain the moving blade in a stable path.

Band saw 10 includes a detection subsystem 22 to detect when a person's body comes into contact with blade 14. Detection subsystem 22 is based on the capacitance of a human body. It is believed that the capacitance of a user's body, as measured through dry contact with a portion of the user's body, is approximately 25-200 picofarads. That capacitance tends to increase with increasing body size and with increased coupling between the user's body and an electrical ground. As a result of the inherent capacitance of a user's body, when the user touches blade 14, the capacitance of the user's body is electrically coupled to the inherent capacitance of the blade, thereby creating an effective capacitance that is larger than the inherent capacitance of the blade alone. Detection subsystem 22 is configured to measure or monitor the capacitance of the blade, so that any substantial change in the measured capacitance would indicate contact between the user's body and the blade.

Figure 3:
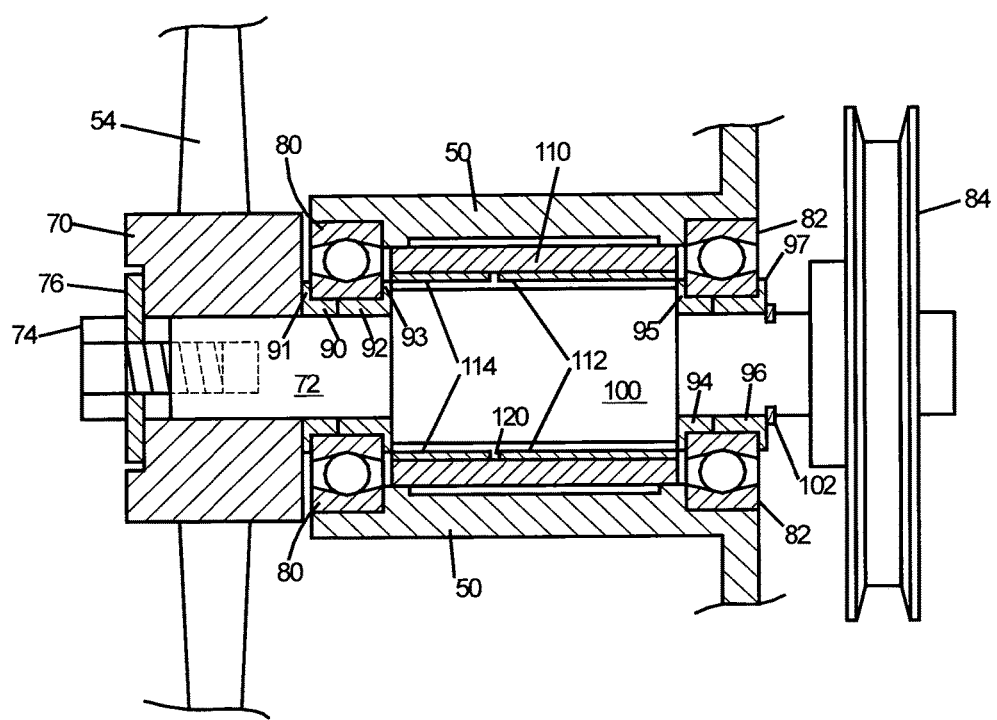
FIG. 3 shows a wheel mount with a capacitive coupling used in the band saw of FIG. 2.

FIG. 3 shows a capacitive coupling that may be used as part of detection subsystem 22 in measuring the capacitance of the blade to detect contact between the blade and a person. In FIG. 3, wheel 54 is shown mounted on an arbor or shaft 72 by a bolt 74 and washer 76. Arbor 72 extends through a hub 70 on the wheel, and bolt 74 is threaded into the arbor and presses against hub 70 to hold the wheel on the arbor.

Arbor 72 is supported for rotational movement by bearings 80 and 82, which are mounted in a portion of housing 50, and which are spaced along the length of the arbor. Bearings 80 and 82 do not directly contact arbor 72 or wheel 54. Rather, arbor 72 and wheel 54 are electrically isolated from bearings 80 and 82 by insulating bushings 90, 92, and 94, 96, respectively. Those bushings are configured to extend around the arbor, to receive the bearings, and to hold the arbor and wheel away from the bearings and housing so there is no metal-to-metal contact between the bearings/housing and the wheel/arbor. The bushings may be made from many different insulating materials, such as PET-P or some other hard plastic. Bushings 90 and 92 are held in place between wheel hub 70 and an enlarged portion 100 on the arbor that has a greater diameter than the rest of the arbor. Bushings 94 and 96, in turn, are positioned between enlarged portion 100 and a snap ring 102 on the arbor. In this manner, wheel 54 is supported by housing 50 for rotational movement, but is also electrically isolated from the housing. Bushing 90 includes a flange 91 sandwiched between hub 70 and bearing 80 to prevent the hub from touching the bearing. Similarly, bushing 92 includes a flange 93, and bushing 94 includes a flange 95, preventing enlarged portion 100 from touching either of bearings 80 or 82, and bushing 96 includes a flange 97 preventing snap ring 102 from touching bearing 82. A pulley 84 is mounted on the end of arbor 72 opposite wheel 54, and a belt (not shown) driven by motor assembly 16 may be used to drive pulley 84 and thereby spin arbor 72 and wheel 54 in bearings 80 and 82 to move blade 14. The belt is typically non-conducting and thus does not electrically couple the arbor to the housing.

A cylindrical, insulating sleeve 110 is positioned and securely held around enlarged portion 100 by housing 50. Sleeve 110 may be press-fit into an appropriate receptacle on the housing. Two electrically conductive plates or tubes 112 and 114, having an outer diameter that fits snugly within sleeve 110, are, in turn, press-fit into sleeve 110. Alternatively or additionally, plates 112 and 114 may be glued or otherwise mounted in sleeve 110. Sleeve 110 and plates 112 and 114 are coaxial and concentric to enlarged portion 100 of arbor 72. Plates 112 and 114 also have an inner diameter slightly larger than the diameter of enlarged portion 100 so that they do not contact any part of arbor 72. Plates 112 and 114 are spaced apart in sleeve 110 by a gap 120. Plates 112 and 114 may be made from any conductive material, such as brass tubing. Sleeve 110 protects plates 112 and 114 from damage and debris, and also electrically isolates the plates from housing 50.

Plates 112 and 114 may be thought of as contact detection plates that are used to create capacitive couplings with the arbor and blade. Detection subsystem 22 includes suitable electrical circuitry (e.g., such as described in U.S. Provisional Patent Application Ser. No. 60/225,200, entitled "Contact Detection System for Power Equipment," filed Aug. 14, 2000, by SD3, LLC, which is herein incorporated by reference) to transmit an input signal to plate 112, and to detect the input signal through plate 114 via wires (not shown) attached to the plates, which wires may extend from the plates through a hole or holes in sleeve 110 to detection subsystem 22. In other words, detection subsystem 22 imparts a signal on plate 112. That signal then drives a signal onto arbor 72 by virtue of the capacitive coupling between the plate and the arbor. The arbor is conductively coupled to wheel 54, so the signal induced on the arbor is also induced on the wheel. Blade 14 loops around a significant portion of the perimeter of wheel 54, so the signal on the wheel induces a signal on the blade. If wheel 54 includes a non-conductive, high-friction material such as rubber around its periphery to prevent the blade from slipping on the wheel when the wheel is rotated, then a signal is induced on the blade by a capacitive coupling between the blade and the wheel. If blade 14 directly contacts wheel 54, then the signal on the blade is the same as the signal on the wheel because of the conductive contact between the wheel and the blade. The signal on the arbor also induces a signal on plate 114 because of the proximity of the plate to the arbor. Thus, plate 114 monitors the signal on the blade/arbor. When a person touches the blade, the effective capacitance of the blade/arbor combination changes, causing the signal on plate 114 to change, thereby signaling contact between the blade and a person.

Plates 112 and 114 are mounted close to, but spaced-apart from, arbor 72. Those plates are capacitively coupled to the arbor by virtue of their size and placement parallel to and spaced-apart from the arbor. It is within the scope of the present invention that the number, size and placement of charge plates or tubes may vary.

The effect of this arrangement is to form two capacitors in series through the arbor, creating a capacitive shunt at the junction between the capacitors. Plates or tubes 112 and 114 function as charge plates of the capacitors. The input signal is capacitively coupled from plate 112 onto arbor 72, and then capacitively coupled from the arbor to plate 114. Any change in the capacitance of the blade/arbor changes the signal coupled to plate 114.

When a user touches blade 14, the capacitance of the user's body creates a capacitive load on the blade. As a result, the size of the capacitive shunt between plates 112 and 114 and the blade is increased, thereby reducing the charge that reaches plate 114. Thus, the magnitude of the input signal passed through the blade to plate 114 decreases when a user touches the blade. Detection subsystem 22 is configured to detect this change in the input signal and transmit a contact detection signal to control subsystem 26.

In some cases, there may be a significant amount of resistance at the contact point of the user's dry skin and the blade. This resistance may reduce the capacitive coupling of the user's body to the blade. However, when the teeth on the blade penetrate the outer layer of the user's skin, the moisture inherent in the internal tissue of skin will tend to decrease the resistance of the skin/blade contact, thereby establishing a solid electrical connection. The sensitivity of detection subsystem 22 can be adjusted as desired to recognize even slight changes in the input signal.

Generally speaking, the spacing of the charge plates or tubes from the arbor is not critical, and may vary depending on the charge plate area and the desired capacitive coupling.

Blade 14 must be electrically isolated from ground for the signal to be induced on the blade. Additionally, capacitive couplings between the blade and other parts of the saw must be minimized so that the relative increased capacitance caused from a person touching the blade is reliably measurable. In other words, if the blade is capacitively coupled to other items, such as to a blade guard or to the housing, then the increased capacitance from a person touching the blade will be insignificant compared to the combined capacitance of the blade and other items, meaning that the contact by the person will be harder to detect and the detection will be less reliable. Specifically, in a band saw, the blade will present a large surface area to wheel 52 and therefore will capacitively couple to that wheel.

Figure 4:
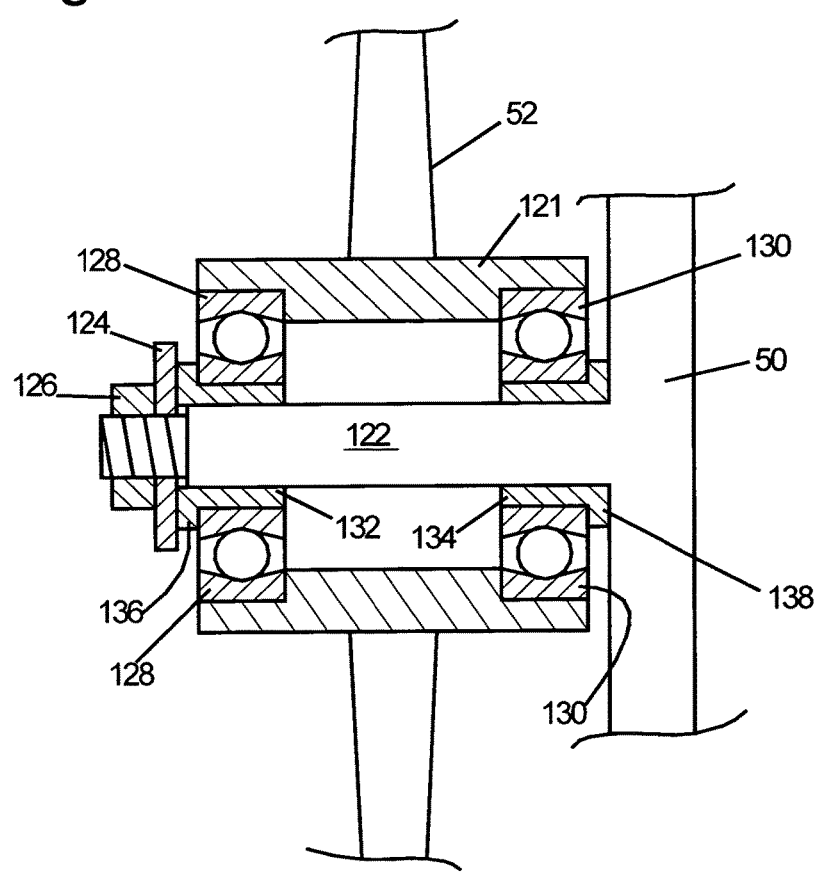
FIG. 4 shows a wheel mount used in the band saw of FIG. 2.

Band saw 10 addresses this issue by electrically isolating wheel 52 from housing 50, as shown in FIG. 4. Wheel 52 includes hub 121, and hub 121 is mounted on spindle 122 by washer 124 and nut 126 threaded onto the spindle. The spindle is mounted to, or is part of, housing 50, so the spindle and housing support the wheel. Bearings 128 and 130 are press fit into appropriate openings in the hub, and the bearings contact spindle 122 and support the hub and wheel on the spindle at spaced apart locations, as shown. The bearings support the wheel for rotational movement on the spindle. Two non-conductive bushings 132 and 134, made from PET-P, a hard plastic, or some other non-conductive material, are positioned between spindle 122 and bearings 128 and 130, respectively, to prevent the bearings from contacting the spindle. Bushing 132 includes a flange 136 sandwiched between bearing 128 and washer 124 to prevent any metal-to-metal contact between the bearing and the washer or spindle. Bushing 134 includes a similar flange 138 sandwiched between bearing 130 and housing 50 to prevent metal-to-metal contact between that bearing and the housing. With this construction, wheel 52 is electrically isolated from housing 50.

Thus, in band saw 10, a charge or signal on plate 112 induces a charge on arbor 72 and wheel 54, which in turn induces a charge on blade 14 and wheel 52. That charge then induces a signal on plate 114, which is monitored by detection subsystem 22. When a person touches the blade, the effective capacitance of the blade/arbor/wheels combination changes, and that change is immediately detected by the detection subsystem. No special or unique blade is required.

It will be appreciated that the size of charge plates 112 and 114 may be selected to provide a desired capacitance with the arbor. Indeed, the size of the charge tubes may be different to provide different capacitances. For example, in the embodiment depicted in FIG. 3, charge plate 112 is longer than charge plate 114, thereby providing a higher capacitance between charge plate 112 and the arbor, than between charge plate 114 and the arbor. Alternatively, or additionally, the inside diameters of the charge tubes may be different to provide different capacitances due to different arbor-to-charge plate spacings.

It will be appreciated that while the charge plates or tubes and insulating sleeve in the exemplary embodiment are cylindrical, other shapes may also be used. For example, insulating sleeve 110 may have a rectangular outer cross-section while maintaining its circular inner cross-section. Likewise, charge plates 112 and 114 may have any suitable outer cross-sectional shape to match the inner shape of the insulating tube.

Since charge plates 112 and 114 should not come into contact with each other, the fit between the charge plates and insulating sleeve 110 is typically tight enough to frictionally prevent movement of the charge plates along the axis of the insulating sleeve. Alternatively, a bump or ring may be formed or positioned on the inner diameter of the insulating sleeve between the charge plates to prevent the charge plates from coming into contact. As a further alternative, caulk, glue, epoxy, or similar material may be applied between the charge plates and insulating sleeve to prevent the charge plates from moving. As another alternative, one or more set-screws may be threaded through the insulating sleeve to bear against the charge tubes, making sure that the set screws do not contact the housing or some other metal that would ground the charge plates.

As explained above, blade 14 should be electrically isolated from housing 50, which is usually grounded. Thus, blade guide assemblies 60 and 62, which may include ball-bearing guides and/or friction pads, etc., are constructed to electrically insulate the blade from the main housing.

Insulating sleeve 110 may also be constructed to receive a Hall Effect or similar sensor to detect blade/arbor rotation, as described in more detail in U.S. Provisional Patent Application Ser. No. 60/225,094, entitled "Motion Detection System for Use in Safety System for Power Equipment," filed Aug. 14, 2000, by SD3, LLC, which is hereby incorporated by reference.

Electrically isolating the blade as described above has the advantage that the blade need not be capacitively isolated from wheels 52 and 54, which is difficult to do effectively. Nevertheless, and alternatively, capacitive couplings to the blade may be created in other ways, such as disclosed in U.S. Provisional Patent Application Ser. No. 60/225,211, entitled "Apparatus and Method for Detecting Dangerous Conditions in Power Equipment," filed Aug. 14, 2000, by SD3, LLC, and incorporated herein by reference.

Figure 5:
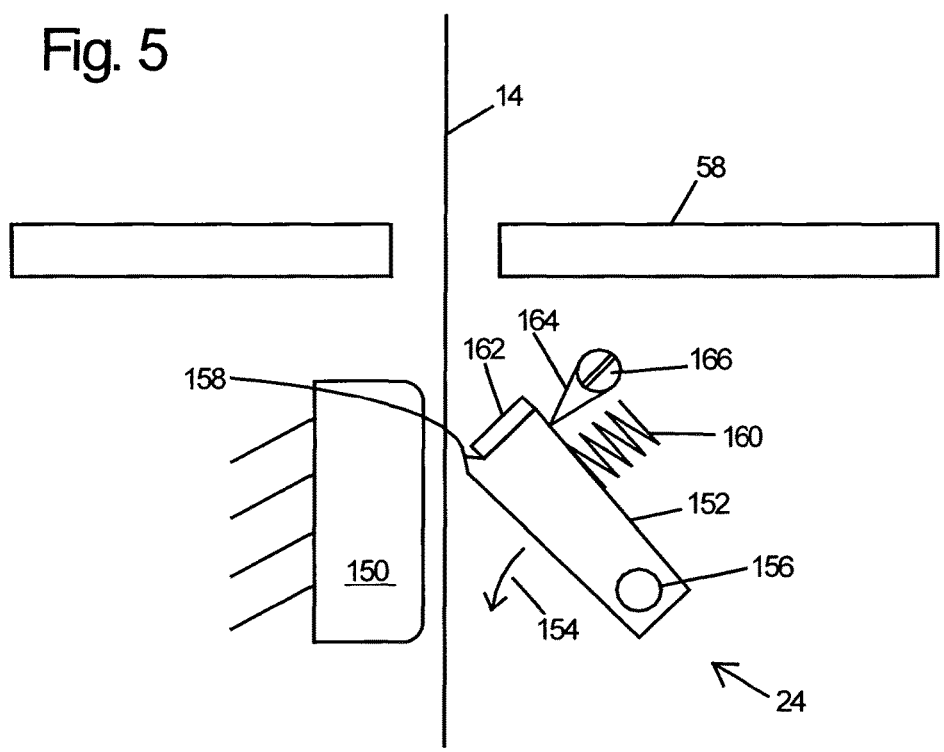
FIG. 5 shows schematically a reaction subsystem that stops a blade by cutting and gripping the blade.

As explained above, when detection subsystem 22 detects contact between blade 14 and a person, reaction subsystem 24 reacts to prevent or limit injury to the person. FIG. 5 shows schematically one embodiment of a reaction system that stops the blade by cutting and gripping the blade. In the illustrated embodiment, reaction subsystem 24 is shown adjacent blade 14 and under table 58. Reaction subsystem 24 includes a backing plate 150 supported by the housing and positioned near one side of blade 14. Backing plate 150 is made of either hardened or non-hardened metal.

A cutting pawl 152 is mounted adjacent backing plate 150 on the opposite side of blade 14. Cutting pawl 152 is made from hardened steel. Cutting pawl 152 is mounted to pivot in the direction of arrow 154 around pivot pin 156 mounted to the housing of the saw. Cutting pawl 152 includes a cutting edge 158 on the end of the pawl opposite pivot pin 156. Pawl 152 is configured to pivot down so that cutting edge 158 contacts blade 14 and cuts the blade against backing plate 150. Cutting pawl 152 and backing plate 150 may be thought of as brake mechanism 28 shown in FIG. 1.

The force to pivot pawl 152 into the blade to cut the blade is, in part, provided by spring 160, which typically is a spring providing approximately 10 to 500 pounds of force. The spring is configured to force pawl 152 in the direction of arrow 154. When spring 160 pushes cutting edge 158 into blade 14, the downward motion of the blade also pushes pawl 152 downward, so that pawl 152 effectively locks on the blade and uses the motion of the blade to help cut the blade. Spring 160 may be thought of as biasing mechanism 30 discussed above.

Cutting pawl 152 also includes a gripping surface 162 to grip the blade and hold it against backing plate 150 both while the blade is cut and thereafter until the pawl is moved back away from the blade. Gripping surface 162 may be simply a surface on the pawl, or it may be a layer of high-friction material such as rubber or plastic, as shown in FIG. 5. Gripping surface 162 also may be thought of as part of brake mechanism 28 discussed above. Gripping surface 162 is optional, and cutting pawl 152 may be made without a gripping surface. In that case, reaction subsystem 24 simply stops the blade by cutting it, without simultaneously gripping the blade.

A fuse wire 164 is used to hold cutting pawl 152 away from blade 14 until the detection subsystem detects that a person has contacted the blade. At that time, a firing subsystem 166 sends a surge of electrical current through fuse wire 164, burning the wire and releasing the cutting pawl. Possible fuse wires and firing subsystems are disclosed in more detail in U.S. Provisional Patent Application Ser. No. 60/225,056, entitled "Firing Subsystem for Use in a Fast-Acting Safety System," filed Aug. 14, 2000, by SD3, LLC, and incorporated herein by reference. A mechanism providing mechanical advantage to hold the cutting pawl away from the blade may be used, as described in U.S. Provisional Patent Application Ser. No. 60/225,056, entitled "Spring-Biased Brake Mechanism for Power Equipment," filed Aug. 14, 2000, by SD3, LLC, and incorporated herein by reference. Fuse wire 164 may be thought of as restraining mechanism 32, and firing subsystem 166 may be thought of as release mechanism 34.

When cutting pawl 152 cuts blade 14, the tension of the blade around wheels 52 and 54 is released and the blade stops immediately. The blade has relatively little mass, and therefore little momentum, so the blade stops without incident. Additionally, the majority of blade 14 is typically within housing 50 so that the housing would contain the blade even if the blade tended to lash out when cut.

Figure 6:
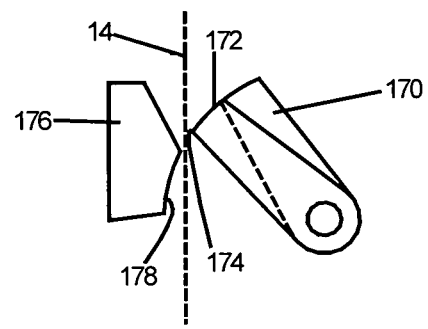
FIG. 6 is a schematic representation of one embodiment of a cutting pawl and backing plate used in a reaction system that stops a blade by cutting the blade.

FIG. 6 shows another type of cutting pawl at 170. Cutting pawl 170 is pivotally mounted to cut blade 14, as described above. Cutting pawl 170 includes a cutting edge 172 that extends helically away from the blade relative to the blade so that the cutting edge first contacts the blade at a point designated at 174, and then progressively moves into and across the blade. The cutting edge may extend helically away from blade 14, as if the pawl had been twisted around an axis perpendicular to the pivot axis of the pawl. Additionally, the pivot point of pawl 170 may be mounted to the housing of the saw so that the pawl pushes blade 14 back, away from where the blade would normally cut, thereby retracting or pushing the blade away from the point where a person most likely would accidentally contact the blade. For example, the pivot may be non-parallel to the table so that the pawl pushes the blade down and back. FIG. 6 also shows a backing plate 176 against which cutting pawl 170 cuts blade 14. Backing plate 176 includes a curved surface 178 that follows the radius of cutting pawl 170 as it pivots. Cutting pawl 170, shown in FIG. 6, may be released to cut blade 14 as described above in connection with the embodiment shown in FIG. 5.

Figure 7:
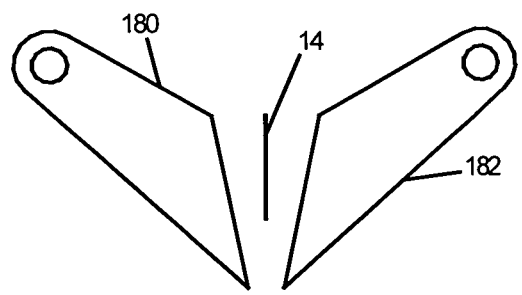
FIG. 7 is a schematic top view of another embodiment of cutting pawls used in a reaction system to stop a blade by cutting the blade.
Figure 8:
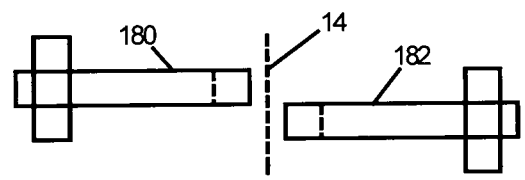
FIG. 8 is a schematic front view of the cutting pawls shown in FIG. 7.

FIG. 7 shows a top view, and FIG. 8 shows a front view, of another way of cutting blade 14 upon the detection of contact between a person and the blade. The embodiment shown in FIGS. 7 and 8 includes two cutting pawls, 180 and 182, each positioned on one side of blade 14, to act like scissors to cut the blade. FIG. 8 shows how the pawls are positioned vertically relative to each other to act like scissors. The pawls would be released by a fuse wire and firing system, and pushed into the blade by springs, as described above. The pawls may be configured to strike the front of blade 14 first so that the pawls retract or push the blade back and away from a user of the saw. Pawls 180 and 182 also could be configured and mounted to the housing to strike blade 14 at an angle so that they lock onto the blade and so that they are self-feeding due to the motion of the blade. Pawls 180 and 182 also could be mounted so that they move down with blade 14 as they cut the blade.

Additionally, any of the cutting pawls described above may have a cutting edge made of carbide or hardened steel.

Figure 9:
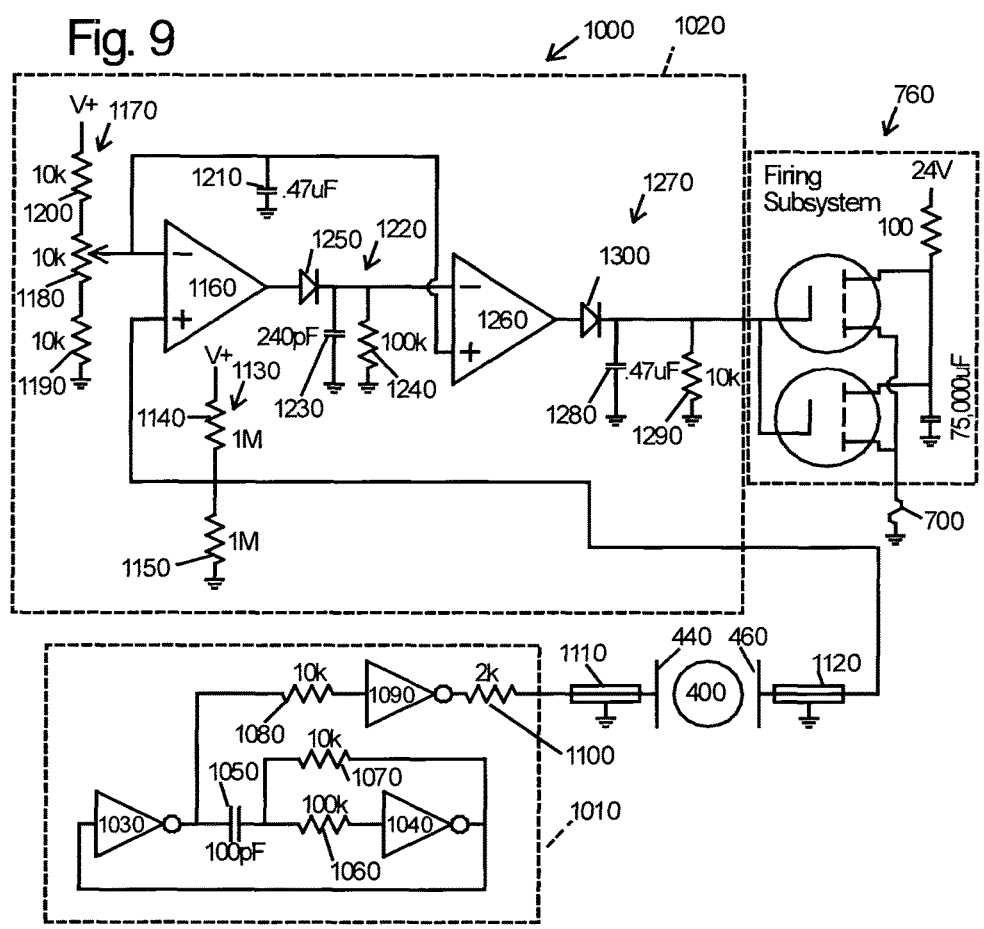
FIG. 9 is a schematic circuit diagram of an electronic subsystem for the safety system of FIG. 1, including an excitation system, a contact sense system and a firing system.

One example of an electronic subsystem 1000 of contact detection subsystem 22 according to the present invention is illustrated in more detail in FIG. 9. Electronic subsystem 1000 is adapted to work with the two-plate capacitive coupling system described in U.S. Provisional Patent Application Ser. No. 60/225,211, entitled "Apparatus and Method for Detecting Dangerous Conditions in Power Equipment," filed Aug. 14, 2000. Electronic subsystem 1000 includes an excitation system 1010 and a monitoring or contact sensing system 1020. However, it will be appreciated by those of skill in the electrical arts that the exemplary configuration of electronic subsystem 1000 illustrated in FIG. 9 is just one of many configurations which may be used. Thus, it will be understood that any suitable embodiment or configuration could be used within the scope of the invention.

As shown in FIG. 9, excitation system 1010 includes an oscillator circuit that generates a wave input signal, such as a square wave signal, at a frequency of approximately 200 khz and voltage amplitude of 12 volts. Alternatively, excitation system 1010 may be configured to generate a signal of a different frequency and/or a different amplitude and/or different waveform. The oscillator is formed by a pair of inverters 1030, 1040 from a CD4040 configured as a bistable oscillator. The output of inverter 1030 is connected to a 100 pF capacitor 1050, which is connected through a 100 kΩ resistor 1060 to the input of inverter 1040. A 10 kΩ resistor 1070 is connected between the output of inverter 1040 to the junction between capacitor 1050 and resistor 1060. The output of inverter 1040 is connected to the input of inverter 1030. A 10 kΩ resistor 1080 connects the output of inverter 1030 to the input of another inverter 1090, which serves as an output buffer to drive the input wave signal onto the blade. A 2 kΩ series resistor 1100 functions to reduce any ringing in the input signal by damping the high frequency components of the signal.

It will be appreciated that the particular form of the oscillator signal may vary and there are many suitable waveforms and frequencies that may be utilized. The waveform may be chosen to maximize the signal-to-noise ratio, for example, by selecting a frequency at which the human body has the lowest resistance or highest capacitance relative to the workpiece being cut. As an additional variation, the signal can be made asymmetric to take advantage of potentially larger distinctions between the electrical properties human bodies and green wood at high frequency without substantially increasing the radio-frequency power radiated. For instance, utilizing a square wave with a 250 khz frequency, but a duty cycle of five percent, results in a signal with ten times higher frequency behavior than the base frequency, without increasing the radio-frequency energy radiation. In addition, there are many different oscillator circuits that are well known in the art and which would also be suitable for generating the excitation signal.

The input signal generated by the oscillator is fed through a shielded cable 1110 onto charge plate 440. Shielded cable 1110 functions to insulate the input signal from any electrical noise present in the operating environment, insuring that a "clean" input signal is transmitted onto charge plate 440. Also, the shielded cable reduces cross talk between the drive signal and the detected signal that might otherwise occur should the cables run close together. Alternatively, other methods may be used to prevent noise in the input signal. As a further alternative, monitoring system 1020 may include a filter to remove any noise in the input signal or other electrical noise detected by charge plate 460. Shielded cable 1110 also reduces radio-frequency emissions relative to an unshielded cable.

As described in more detail in U.S. Provisional Patent Application Ser. No. 60/225,211, entitled "Apparatus and Method for Detecting Dangerous Conditions in Power Equipment," filed Aug. 14, 2000, the input signal is coupled from charge plate 440 to charge plate 460 via blade 400. As shown in FIG. 9, the signal received on charge plate 460 is then fed via a shielded cable 1120 to monitoring system 1020. The monitoring system is configured to detect a change in the signal due to contact between the user's body and the blade. It will be appreciated that monitoring system 1020 may be implemented in any of a wide variety of designs and configurations. In the exemplary embodiment depicted in FIG. 9, monitoring system 1020 compares the amplitude of the input signal received at charge plate 460 to a determined reference voltage. In the event that the input signal received at charge plate 460 falls below the reference voltage for a determined time, the monitoring system produces an output signal to reaction subsystem 24. The reaction subsystem is configured to receive the output signal and immediately act to stop the blade.

The particular components of monitoring system 1020 may vary depending on a variety of factors including the application, the desired sensitivig, availability of components, type of electrical power available, etc. In the exemplary embodiment, a shielded cable 1120 is connected between charge plate 460 and a voltage divider 1130. Voltage divider 1130 is formed by two 1 MΩ resistors 1140, 1150 connected in series between the supply voltage (tyically about 12 volts) and ground. The voltage divider functions to bias the output signal from charge plate 460 to an average level of half of the supply voltage. The biased signal is fed to the positive input of an op-amp 1160. Op-amp 1160 may be any one of many suitable op-amps that are well known in the art. An example of such an op-amp is a TL082 op-amp. The negative input of the op-amp is fed by a reference voltage source 1170. In the exemplary embodiment, the reference voltage source is formed by a 10 kΩ potentiometer 1180 coupled in series between two 10 kΩ resistors 1190, 1200, which are connected to ground and the supply voltage, respectively. A 0.47 μF capacitor 1210 stabilizes the output of the reference voltage.

As will be understood by those of skill in the art, op-amp 1160 functions as a comparator of the input signal and the reference voltage. Typically, the voltage reference is adjusted so that its value is slightly less than the maximum input signal voltage from charge plate 460. As a result, the output of the op-amp is low when the signal voltage from the charge plate is less than the reference voltage and high when the signal voltage from the charge plate is greater than the reference voltage. Where the input signal is a periodic signal such as the sguare wave generated by excitation system 1010, the output of op-amp 1160 will be a similar periodic signal. However, when a user contacts the blade, the maximum input signal voltage decreases below the reference voltage and the op-amp output no longer goes high.

The output of op-amp 1160 is coupled to a charging circuit 1220. Charging circuit 1220 includes a 240 pF capacitor 1230 that is connected between the output of op-amp 1160 and ground. A 100 kΩ discharge resistor 1240 is connected in parallel to capacitor 1230. When the output of op-amp 1160 is high, capacitor 1230 is charged. Conversely, when the output of op-amp 1160 is low, the charge from capacitor 1230 discharges through resistor 1240 with a time constant of approximately 24 μs. Thus, the voltage on capacitor 1230 will discharge to less than half the supply voltage in approximately 25-50 μs unless the capacitor is recharged by pulses from the op-amp. A diode 1250 prevents the capacitor from discharging into op-amp 1160. Diode 1250 may be any one of many suitable diodes that are well known in the art, such as a 1N914 diode. It will be appreciated that the time reguired for capacitor 1230 to discharge may be adjusted by selecting a different value capacitor or a different value resistor 1240.

As described above, charging circuit 1220 will be recharged repeatedly and the voltage across capacitor 1230 will remain high so long as the detected signal is received substantially unattenuated from its reference voltage at op-amp 1160. The voltage from capacitor 1230 is applied to the negative input of an op-amp 1260. Op-amp 1260 may be any one of many suitable op-amps, which are well known in the art, such as a TL082 op-amp. The positive input of op-amp 1260 is tied to a reference voltage, which is approximately equal to one-half of the supply voltage. In the exemplary embodiment depicted in FIG. 9, the reference voltage is provided by reference voltage source 1170.

So long as charging circuit 1220 is recharged, the output of op-amp 1260 will be low. However, if the output of op-amp 1160 does not go high for a period of 25-50 μs, the voltage across capacitor 1230 will decay to less than the reference voltage, and op-amp 1260 will output a high signal indicating contact between the user's body and the blade. As described in U.S. Provisional Patent Application Ser. No. 60/225,056, entitled "Firing Subsystem for Use in a Fast-Acting Safety System," U.S. Provisional Patent Application Serial No. 60/225,170, entitled "Spring-Biased Brake Mechanism For Power Equipment," and U.S. Provisional Patent Application Ser. No. 60/225,169, entitled "Brake Mechanism for Power Equipment," all filed Aug. 14, 2000, the output signal from op-amp 1260 is coupled to actuate reaction subsystem 24 and stop the blade. The time between contact and activation of the reaction system can be adjusted by selecting the time constant of capacitor 1230 and resistor 1240.

It should be noted that, depending on the size, configuration and number of teeth on the blade and the position of contact with the operator, the electrical contact between the operator and blade will often be intermittent. As a result, it is desirable that the system detect contact in a period less than or equal to the time a single tooth would be in contact with a user's finger or other body portion. For example, assuming a 10-inch circular blade rotating at 4000 rpm and a contact distance of about one-quarter of an inch (the approximate width of a fingertip), a point on the surface of the blade, such as the point of a tooth, will be in contact with the user for approximately 100 µs. After this period of contact, there will normally be an interval of no contact until the next tooth reaches the finger. The length of the contact and non-contact periods will depend on such factors as the number of teeth on the blade and the speed of rotation of the blade.

It is preferable, though not necessary, to detect the contact with the first tooth because the interval to the second tooth may be substantial with blades that have relatively few teeth. Furthermore, any delay in detection increases the depth of cut that the operator will suffer. Thus, in the exemplary embodiment, the charging circuit is configured to decay within approximately 25-50 µs to ensure that monitoring system 102 responds to even momentary contact between the user's body and the blade. Further, the oscillator is configured to create a 200 khz signal with pulses approximately every 5 µs. As a result, several pulses of the input signal occur during each period of contact, thereby increasing the reliability of contact detection. Alternatively, the oscillator and charging circuit may be configured to cause the detection system to respond more quickly or more slowly. Generally, it is desirable to maximize the reliability of the contact detection, while minimizing the likelihood of erroneous detections.

As described above, the contact between a user's body and the teeth of blade 400 might be intermittent depending on the size and arrangement of the teeth. Although monitoring system 1020 typically is configured to detect contact periods as short as 25-50 µs, once the first tooth of the blade passes by the user's body, the contact signal received by the second electrical circuit may return to normal until the next tooth contacts the user's body. As a result, while the output signal at op-amp 1260 will go high as a result of the first contact, the output signal may return low once the first contact ends. As a result, the output signal may not remain high long enough to activate the reaction system. For instance, if the output signal does not remain high long enough to actuate firing subsystem 760, fusible member 700, may not melt. Therefore, monitoring system 1020 may include a pulse extender in the form of charging circuit 1270 on the output of op-amp 1260, similar to charging circuit 1220. Once op-amp 1260 produces a high output signal, charging circuit 1270 functions to ensure that the output signal remains high long enough to sufficiently discharge the charge storage devices to melt the fusible member. In the exemplary embodiment, charging circuit 1270 includes a 0.47 µF capacitor 1280 connected between the output of op-amp 1260 and ground. When the output of op-amp 1260 goes high, capacitor 1280 charges to the output signal level. If the output of op-amp 1260 returns low, the voltage across capacitor 1280 discharges through 10 k resistor 1290 with a time constant of approximately 4.7 ms. A diode 1300, such as an 1N914 diode, prevents capacitor 1280 from discharging through op-amp 1260. The pulse extender insures that even a short contact with a single tooth will result in activation of the reaction system.

The above-described system is capable of detecting contact within approximately 50 µs and activating the reaction system. As described in more detail in U.S. Provisional Patent Application Ser. No. 60/225,056, entitled "Firing Subsystem for Use in a Fast-Acting Safety System," U.S. Provisional Patent Application Ser. No. 60/225,170, entitled "Spring-Biased Brake Mechanism For Power Equipment," and U.S. Provisional Patent Application Ser. No. 60/225,169, entitled "Brake Mechanism for Power Eguipment," all filed Aug. 14, 2000, in the context of reaction system for braking a saw blade, a brake can be released in approximately less than 100 µs and as little as 20 µs. The brake contacts the blade in approximately one to approximately three milliseconds. The blade will normally come to rest within not more than 2-10 ms of brake engagement. As a result, injury to the operator is minimized in the event of accidental contact with the cutting tool. With appropriate selection of components, it may be possible to stop the blade within 2 ms, or less.

While exemplary embodiments of excitation system 1010 and monitoring system 1020 have been described above with specific components having specific values and arranged in a specific configuration, it will be appreciated that these systems may be constructed with many different configurations, components, and values as necessary or desired for a particular application. The above configurations, components, and values are presented only to describe one particular embodiment that has proven effective, and should be viewed as illustrating, rather than limiting, the invention.

Figure 10:
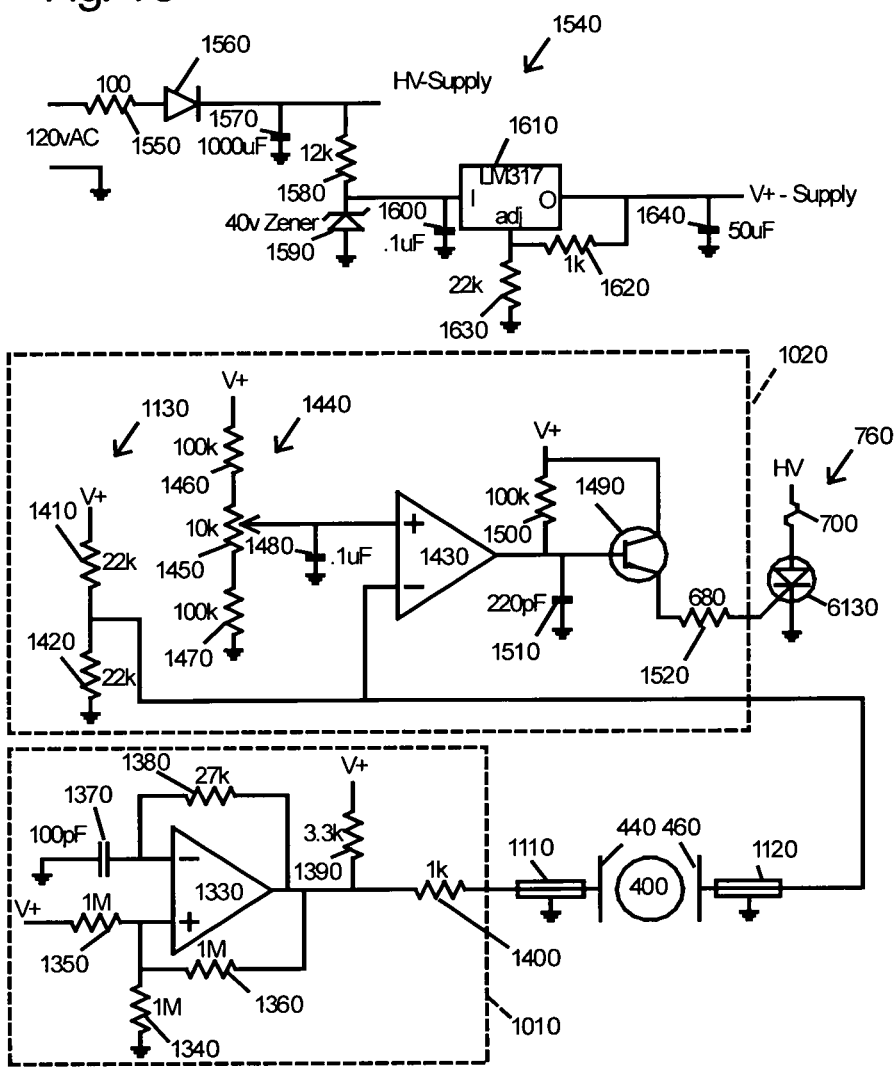
FIG. 10 is a schematic circuit diagram of a first alternative electronic subsystem for the safety system of FIG. 1, including an excitation system, a contact sense system and a firing system.

FIG. 10 shows alternative embodiments of excitation system 1010 and monitoring system 1020, as well as firing system 760, which is described in more detail in U.S. Provisional Patent Application Ser. No. 60/225,056, titled "Firing Subsystem for Use in a Fast-Acting Safety System," filed Aug. 14, 2000. Alternative excitation system 1010 is configured to generate a square wave signal using only a single comparator 1330 such as an LM393 comparator. A 1M resistor 1340 is connected between the high input terminal of comparator 1330 and ground. Another 1M resistor 1350 is connected between the high input terminal of comparator 1330 and a low voltage supply V. A 1M resistor 1360 is connected between the high input terminal of the comparator and the output of the comparator. A 100 pF capacitor 1370 is connected between the low input terminal of the comparator and ground. A 27 k resistor 1380 is connected between the low input terminal of the comparator and the output of the comparator. A 3.3 k resistor 1390 is connected between the low voltage supply V and the output of the comparator. The alternative oscillator circuit illustrated in FIG. 12 produces a square wave having a frequency of approximately 3-500 khz. A 1 k resistor 1400 is connected between the output of the comparator and shielded cable 1110 to reduce ringing. It will be appreciated that the values of one or more elements of alternative excitation system 1010 may be varied to produce a sigpal having a different freguency, waveform, etc.

As in the exemplag embodiment described above, the signal generated by alternative excitation system 1010 is fed through shielded cable 1110 to charge plate 440. The signal is capacitively coupled to charge plate 460 via blade 400. Alternative monitoring system 1020 receives the signal from charge plate 460 via shielded cable 1120 and compares the signal to a reference voltage. If the signal falls below the reference voltage for approximately 25 µs, an output signal is generated indicating contact between the blade and the user's body.

Alternative monitoring system 1020 includes a voltage divider 1130, which is formed of 22 k resistors 1410 and 1420. The voltage divider biases the sigpal received via cable 1120 to half the low voltage supply V. The lower resistance of resistors 1410, 1420 relative to resistors 114, 1150 serves to reduce 60 hz noise because low-frequency signals are attenuated. The biased signal is fed to the negative input terminal of a second comparator 1430, such as an LM393 comparator. The positive terminal of comparator 1430 is connected to reference voltage source 1440. In the depicted embodiment, the reference voltage source is formed by a 10 kΩ potentiometer 1450 coupled in series between two 100 kΩ resistors 1460, 1470 connected to the low voltage supply V and ground, respectively. A 0.1 µF capacitor 1480 stabilizes the output of the reference voltage. As before, the reference voltage is used to adjust the trigger point.

The output of second comparator 1430 is connected to the base terminal of an NPN bipolar junction transistor 1490, such as a 2N3904 transistor. The base terminal of transistor 1490 is also connected to low voltage supply V through a 100 k resistor 1500, and to ground through a 220 pF capacitor 1510. Potentiometer 1450 is adjusted so that the voltage at the positive terminal of comparator 1430 is slightly lower than the high peak of the signal received at the negative terminal of the second comparator when there is no contact between the blade and the user's body. Thus, each high cycle of the signal causes the second comparator output to go low, discharging capacitor 1510. So long as there is no contact between the blade and the user's body, the Output of the second comparator continues to go low, preventing capacitor 1510 from charging up through resistor 1500 and switching transistor 1490 on. However, when the user's body contacts the blade or other isolated element, the signal received at the negative terminal of the second comparator remains below the reference voltage at the positive terminal and the output of the second comparator remains high. As a result, capacitor 1510 is able to charge up through resistor 1500 and switch transistor 1490 on.

The collector terminal of transistor 1490 is connected to low voltage supply V, while the emitter terminal is connected to 680 Ω resistor 1520. When transistor 1490 is switched on, it supplies an output signal through resistor 1520 of approximately 40 mA, which is fed to alternative firing system 760. As described in more detail in U.S. Provisional Patent Application Ser. No. 60/225,056, titled "Firing Subsystem for Use in a Fast-Acting Safety System," filed Aug. 14, 2000, the alternative firing circuit includes fusible member 700 connected between a high voltage supply HV and an SCR 6130, such as an NTE 5552 SCR. The gate terminal of the SCR is connected to resistor 1520. Thus, when transistor 1490 is switched on, the approximately 40 mA current through resistor 1520 turns on SCR 6130, allowing the high voltage supply HV to discharge to ground through fusible member 700. Once the SCR is switched on, it will continue to conduct as long as the current through fusible member 700 remains above the holding current of approximately 40 mA, even if the current to the gate terminal is removed. Thus, the SCR will conduct current through the fusible member until the fusible member is melted or the high voltage source is exhausted or removed. The fact that the SCR stays on once triggered allows it to respond to even a short pulse through resistor 1520.

FIG. 10 also illustrates an exemplary electrical supply system 1540 configured to provide both low voltage supply V and high voltage supply HV from standard 120 VAC line voltage. Electrical supply system 1540 is connected to provide low voltage supply V and high voltage supply HV to alternative excitation system 1010, alternative monitoring system 1020, and alternative firing system 760. The line voltage is connected through a 100 Ω resistor 1550 and a diode 1560, such as a 1N4002 diode, to a 1000 µF charge storage capacitor 1570. The diode passes only the positive portion of the line voltage, thereby charging capacitor 1570 to approximately 160V relative to ground. The positive terminal of capacitor 1570 serves as the high voltage supply HV connected to fusible link 700. When SCR 6130 is switched on upon detection of contact between the blade and the user's body, the charge stored in capacitor 1570 is discharged through the fusible link until it melts. It will be appreciated that the size of capacitor 1570 may be varied as required to supply the necessary current to melt fusible member 700. As described in U.S. Provisional Patent Application Ser. No. 60/225,056, titled "Firing Subsystem for Use in a Fast-Acting Safety System," filed Aug. 14, 2000, use of a HV capacitor leads to a much higher current surge, and therefore a faster melting of the fusible member than is the case with a low voltage system.

The positive terminal of capacitor 1570 also provides a transformer-less source of voltage for low voltage supply V, which includes a 12 k resistor 1580 connected between the positive terminal of capacitor 1570 and a reverse 40V Zener diode 1590. Diode 1590 functions to maintain a relatively constant 40V potential at the junction between the diode and resistor 1580. It can be seen that the current through the 12 k resistor will be about 10 mA. Most of this current is used by the low voltage circuit, which has a relatively constant current demand of about 8 mA. Note that while resistor 1580 and diode 1590 discharge some current from capacitor 1570, the line voltage supply continuously recharges the capacitor to maintain the HV supply. A 0.1 µF capacitor 1600 is connected in parallel with diode 1590 to buffer the 40V potential of the diode, which is then connected to the input terminal of an adjustable voltage regulator 1610, such as an LM317 voltage regulator. The ratio of a 1 k resistor 1620 connected between the output terminal and adjustment terminal, and a 22 k resistor 1630 connected between the adjustment terminal and ground, set the output voltage of regulator 1610 to approximately 30 VDC. A 50 µF capacitor 1640 is connected to the output terminal of regulator 1610 to buffer sufficient charge to ensure that low voltage supply V can provide the brief 40 mA pulse necessary to switch on SCR 6130. The described low voltage source is advantageous because of its low cost and low complexity.

It should be noted that when high voltage supply HV is discharged through fusible member 700, the input voltage to voltage regulator 1610 may temporarily drop below 30V, thereby causing a corresponding drop in the low voltage supply V. However, since the reaction system has already been triggered, it is no longer necessary for the detection system to continue to function as described and any drop in low voltage supply V will not impair the functioning of safety system 18.

It will be appreciated by those of skill in the electrical arts that the alternative embodiments of excitation system 1010, monitoring system 1020, firing system 760, and electrical supply system 1540 may be implemented on a single substrate and/or in a single package. Additionally, the particular values for the various electrical circuit elements described above may be varied depending on the application.

One limitation of the monitoring systems of FIGS. 9 and 10 is that they actuate the reaction system whenever the incoming amplitude from charge plate 460 drops below a preset threshold. Under most circumstances this represents a reliable triggering mechanism. However, when cutting green wood, a substantial additional capacitive and resistive load is coupled to the blade. The moisture in green wood gives it a very high dielectric constant, and an increased conductivity relative to dg wood. In fact, when cutting very green wood, i.e. over 50% moisture content, the amplitude of the signal on charge plate 460 can drop to a level eguivalent to what is seen when a user contacts the blade. Thus, the systems of FIGS. 9 and 10 are limited in their ability to offer protection while processing green wood.

Figure 11:
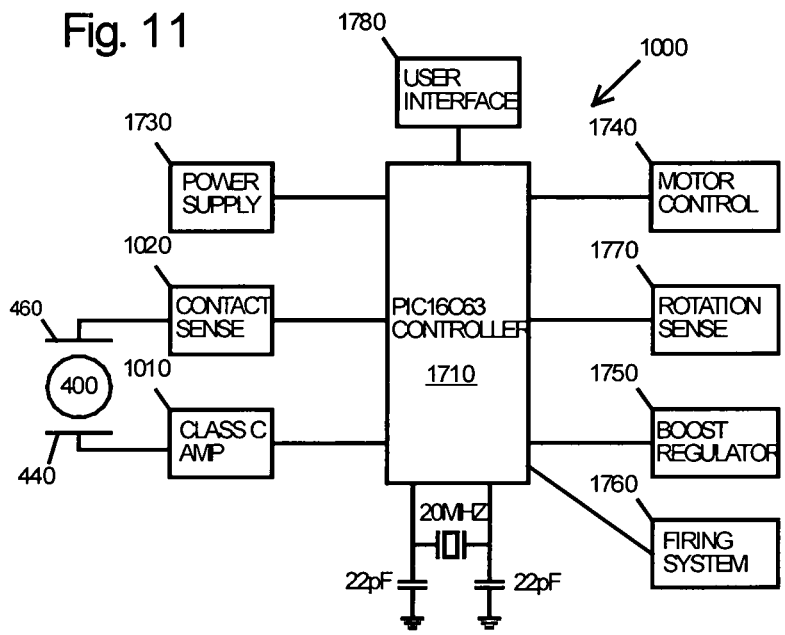
FIG. 11 is a block diagram illustrating the arrangement of a second alternative electronic subsystem.

Another embodiment of an electronic subsystem 100 adapted to accommodate green wood and offering certain other benefits is shown in FIGS. 11-19. As shown in FIG. 11, system 1000 includes an excitation system 1010 in the form of a class-C amplifier connected to a micro-controller 1710. System 1000 also includes a monitoring system 1020 in the form of a contact sense circuit connected to controller 1710. A power supply 1730 supplies power to the various elements of system 1000. A motor controller 1740 is adapted to turn a motor off and on based on signals from the controller. A boost regulator 1750 operates to charge a firing system 1760. A rotation sense circuit 1770 detects rotation of the cutting tool. Lastly, a user interface 1780 is provided to allow a user to control operation of the saw and provide feedback on the status of the system.

A computer program listing for a controller as shown in FIG. 5 is submitted herewith as a Computer Program Listing Appendix.

Figure 12:
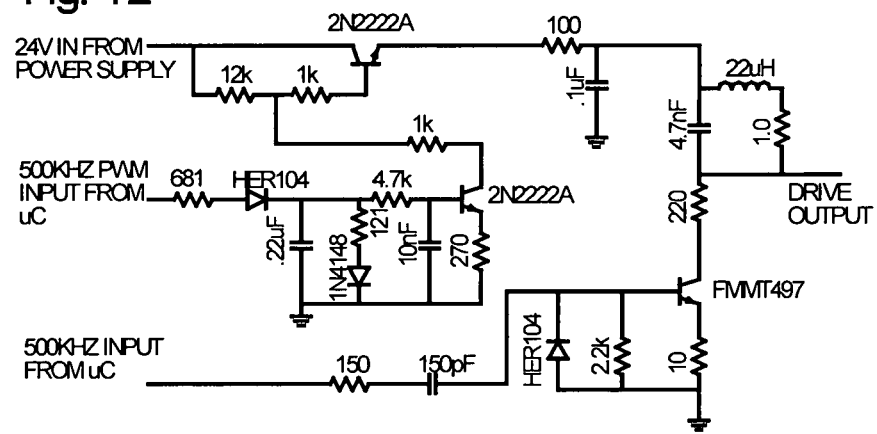
FIG. 12 is a schematic diagram of an excitation system of the subsystem of FIG. 11.

FIG. 12 illustrates the circuitry of the class-C amplifier in more detail. The amplifier includes a drive output that is coupled to plate 440 as shown in FIG. 11. The drive output is sinusoidal at about 500 khz and the amplitude is adjustable between about 3 volts and 25 volts. A 32-volt input supply line from the power supply provides power for the amplifier. The base frequency is provided by a 500 khz square wave input from the controller. The amplitude is controlled by pulse width modulation from the controller.

The controller is programmed to adjust the drive voltage output from the amplifier to maintain a predetermined amplitude at plate 460 under varying capacitive loads. Thus, when cutting green wood, the controller ramps up the drive voltage to maintain the desired voltage on plate 460. The controller is preferably capable of skewing the drive voltage between about 1 and 50% per millisecond, and more preferably between 1 and 10%. This allows the system to maintain a constant output level under the varying load created while sawing green wood, or such as might be created by placing a conductive member such a fence near the blade. The controller should preferably not skew the drive voltage by much more than 50% per millisecond, or it may counteract the drop in signal created by a user contact event.

Figure 13:
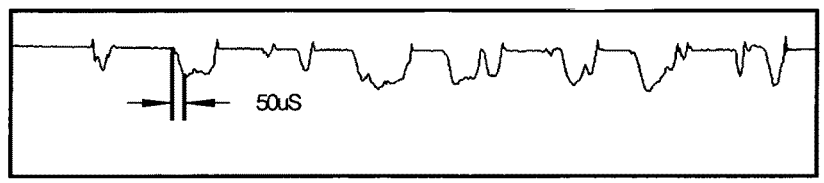
FIG. 13 shows an exemplary attenuation in signal that occurs when the finger of a user contacts a blade.

FIG. 13 illustrates the change in signal amplitude seen at plate 460 as the teeth of a 10-inch, 36-tooth saw blade spinning at 4000 rpm contacts a user's finger. Each of the drops in the signal amplitude is from a single tooth moving through the skin of the finger. It can be seen, for instance, that the signal amplitude drops by about 30% over about 50 µS as the second tooth strikes the finger. When cutting very green wood, the sigpal attenuation upon contact will be more like 15%, but will occur over the same 50 µS. Therefore, as long as the system can detect a contact event of a 5-25% or greater drop in less than 100 µS, providing a skew rate of around 10% per millisecond should not override an actual event. It will be understood that the skew rate and trigger thresholds can be adjusted as desired. The primary limiting factor is that the trigger threshold should not be so small that noise creates false triggers, unless false triggers are acceptable.

Figure 14:
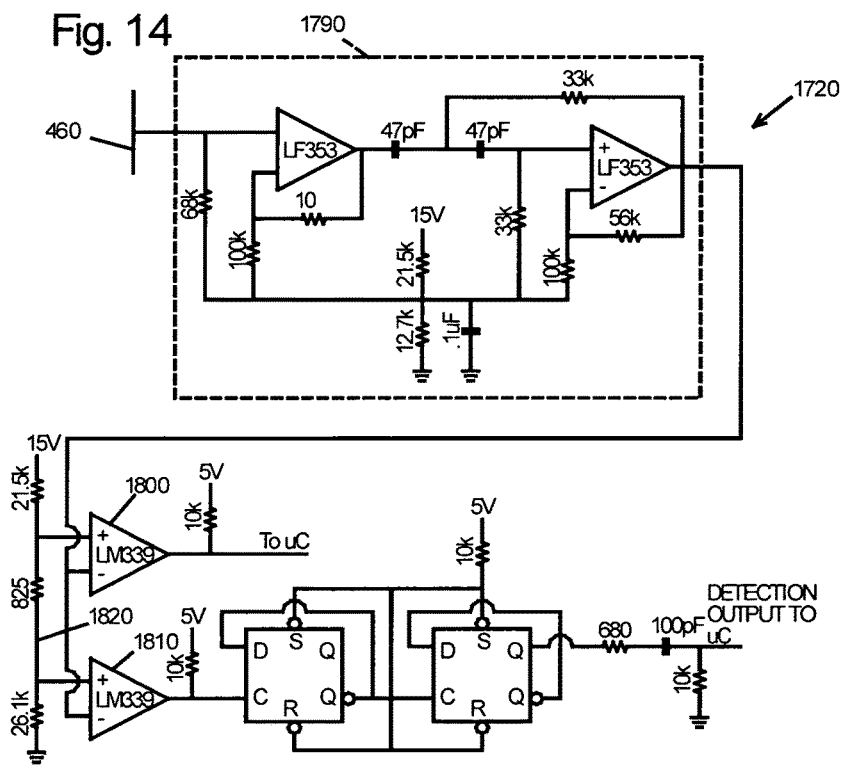
FIG. 14 is a schematic of a contact sense portion of the subsystem of FIG. 11.

FIG. 14 shows the details of the contact sense circuit. The contact sense circuit receives input from plate 460. In this embodiment, the preferred capacitive coupling between the blade and the plates is about 30 pF for the drive plate and about 10 pF for plate 460. The larger drive plate size improved signal transfer for a given total capacitance of both plates. The actual values are not critical, and equal values could be used as well. Generally speaking, the capacitance of the drive plate should be comparable to the human body capacitance to be detected, i.e. 10-200 pF The input from plate 460 is fed through a high-pass filter 1790 to attenuate any low frequency noise, such as 60 hz noise, picked up by plate 460. Filter 1790 can also provide amplification of the signal to a desired level as necessary. The output of the filter is fed into a set of comparators 1800, 1810. Comparator 1800 pulses high briefly if the maximum signal amplitude from the filter exceeds the value at its positive input set by voltage divider 1820. The output pulses from the comparator are fed to the controller. The controller samples over a 200 µS window and modulates the drive amplitude to attempt to maintain the sensed voltage at a level so that 50% of the waveform cycles generate a pulse through comparator 1800. If less than 50% generate pulses, then the controller raises the drive voltage by a set amount. Likewise, if more than 50% generate pulses, the drive voltage is lowered. The system can be configured to step by larger or smaller amounts depending on the deviation from 50% observed during a particular window. For instance, if 45 pulses are observed, the system may step up the drive amplitude by 1%. However, if only 35 pulses are observed, the system may step by 5%. The system will continually "hunt" to maintain the proper drive level. By selecting the window duration and adjustment amount, it is possible to control the skew rate to the desired level as described above.

Comparator 1810 pulses every cycle of the waveform so long as the sensed voltage exceeds a lower trigger threshold set by voltage divider 1820. Therefore, under normal circumstances, this is a 500 khz pulse. The pulse output from comparator 1810 is fed through a divide-by-four circuit formed by two D-flip flops to reduce the frequency to 125 khz — or an 8 µS period. The output of the divider is fed to the controller. The controller monitors this line to insure that a pulse occurs at least every 18 µS. Therefore, if more than about half of the pulse are missing in over an 18 µS period, the controller will trigger the reaction system. Of course, the particular period can be selected as desired to maximize reliability of contact detection and minimize false triggers. A benefit of the described arrangement is that a single pulse or even two may be missing, such as due to noise, without triggering the system. However, if more pulses are missing, the system will still be triggered reliably. The particular trigger level for missing pulses is set by the voltage divider. This level will typically be between 5 and 40% for the described system.

FIG. 15 illustrates the circuit of power supply 1730. The power supply includes an unregulated 32-volt output and regulated 5, 15 and 24-volt outputs. The 24-volt output is used to power the excitation signal, which has a relatively large voltage, and the 32-volt output powers a capacitor charging circuit described below. The 5-volt output powers the controller and other logic circuitry, while the 15-volt output operates most of the analog electronics. A low-voltage output is monitored by the controller to insure that adequate voltage is present to operate the system.

Boost regulator 1750 and firing system 1760 are shown in FIG. 16. Boost regulator 1750 includes a buck-boost charger 1830 that steps up the 32-volt supply input to 180 volts for charging the firing circuit. The controller provides a 125 khz input to modulate the buck-boost cycle of the charger. A regulator circuit 1840 monitors the voltage from the firing circuit and turns the charger on or off as necessary to maintain the charge near 180 volts. The regulator circuit is constructed with a predetermined amount of hysteresis so that the charger will turn on when the firing circuit voltage falls below 177 volts and turn off when the voltage reaches 180 volts, as set by the voltage divider inputs and feedback to comparator 1850. The output of comparator 1850 is fed to the controller. By monitoring the charge and discharge time based on the state of the output of comparator 1850, the controller can verify that the capacitor in the firing circuit is operating properly and storing adequate charge. An overvoltage circuit uses a 220V transient suppressor to signal the controller if the voltage on the capacitor exceeds about 220V. This testing is described in more detail in U.S. Provisional Patent Application Ser. No. 60/225,059, titled "Logic Control for Fast-Acting Safety System," filed Aug. 14, 2000. The firing circuit is described in more detail in U.S. Provisional Patent Application Ser. No. 60/225,056, titled "Firing Subsystem for Use in a Fast-Acting Safety System," filed Aug. 14, 2000.

Figure 17:
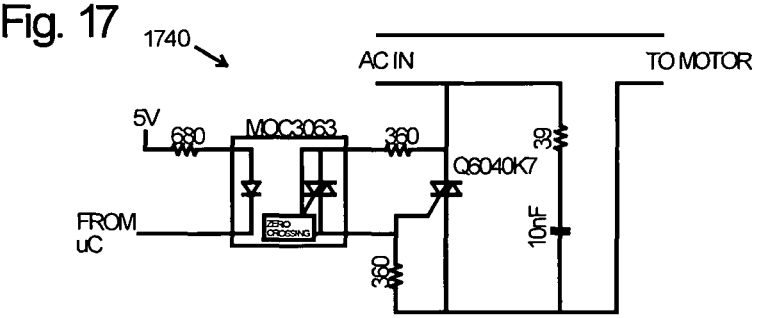
FIG. 17 is a schematic of a motor control portion of the subsystem of FIG. 11.

FIG. 17 illustrates the circuitry of motor control 1740. The motor control receives a logic level control signal from the controller to turn the motor on and off based on input from the user interface described in more detail below. The motor control also turns off the motor when a trigger event occurs. The logic signal is electrically isolated from the motor voltage by an optoisolated triac driver. This isolates the ground of the detection system from the ground of the motor power. A mechanical relay or similar device can also be used and will provide the same isolation. When the optoisolated triac drive receives a signal from the controller, it turns on Q6040K7 triac to provide power to the machine.

Figure 18:
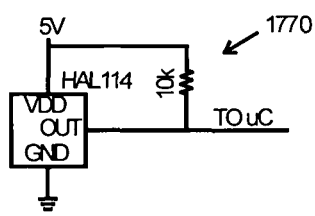
FIG. 18 is a schematic of a rotation sensor portion of the subsystem of FIG. 11.

The rotation sense circuit is shown in FIG. 18. The purpose of the rotation sense circuit is to insure that the contact detection system is not turned off until the cutter or blade as stopped. The rotation sense circuit utilizes a hall-effect sensor that is located adjacent a rotating portion of the machine. A small magnet is inserted in the rotating portion to signal the hall-effect sensor. Output of the hall-effect sensor is fed to the controller. As described in more detail in U.S. Provisional Patent Application Ser. No. 60/225,059, titled "Logic Control for Fast-Acting Safety System," filed Aug. 14, 2000, the controller monitors the output of the hall-effect sensor to determine when the cutter has coasted to a stop. Once the cutter stops, any sensed contact will no longer trigger the reaction system. It should be noted that rotation of the cutter could be detected by other arrangements as well. Various suitable mechanisms are described in U.S. Provisional Patent Application Ser. No. 60/225,094, titled "Motion Detecting System for Use in A Safety System for Power Equipment," filed Aug. 14, 2000.

For instance, a small eccentricity can be placed on the cutter or some other isolated structure that rotates with the cutter, such as the arbor. This eccentricity can be placed to pass by sense plate 460 or by a separate sensing plate. The eccentricity will modulate the detected signal amplitude so long as the cutter is rotating. This modulation can be monitored to detect rotation. If the eccentricity is sensed by sense plate 460, it should be small enough that the signal modulation generated will not register as a contact event. As another alternative, rotation can be sensed by electromagnetic feedback from the motor.

The controller may also be designed to monitor line voltage to insure that adequate voltage is present to operate the system. For instance, during motor start up, the AC voltage available to the safety system may drop nearly in half depending on the cabling to the saw. If the voltage drops below a safe level, the controller can shut off the saw motor. Alternatively, the controller may include a capacitor of sufficient capacity to operate the system for several seconds without power input while the saw is starting.

Figure 19:
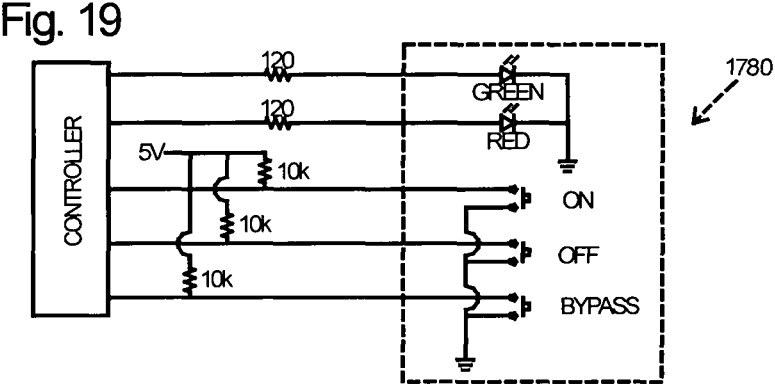
FIG. 19 is a schematic of a user interface portion of the subsystem of FIG. 11.

User interface 1780 is shown in FIG. 19. The user interface includes start, stop and bypass buttons that are used to control the operation of the saw. The bypass button allows the user to disable the contact detection system for a single on/off cycle of the saw so as to be able to saw metal or other materials that would otherwise trigger the reaction system. The user interface also includes red and green LEDs that are used to report the status of the system to a user. More details on the operation of suitable user interfaces are described in U.S. Provisional Patent Application Ser. No. 60/225,059, titled "Logic Control for Fast-Acting Safety System," filed Aug. 14, 2000.

Two additional electronic configurations for detection subsystem 22 are shown in FIGS. 20-24. As illustrated in FIG. 21, the alternative detection systems utilize a microcontroller 1710 to manage and monitor various functions. An excitation system delivers a 350 khz sine wave drive signal through plate 44 to the blade. The circuit for generating the drive signal is illustrated in FIG. 21. The excitation circuit uses a 700 khz oscillator with an output fed into a double to generate a 1.4 Mhz signal. The output of the double is fed into a set of S-R flip-flops to extract phase signals at 90-degree intervals. The phase signals are used to drive a synchronous detection system that forms one of the two embodiments of FIGS. 20-24 and is shown in more detail in FIG. 23. The 350 khz square wave 180-degree phase signal is fed through an inverter and a buffer amplifier into a Q=10, 350 khz band pass filter.

Figure 22:
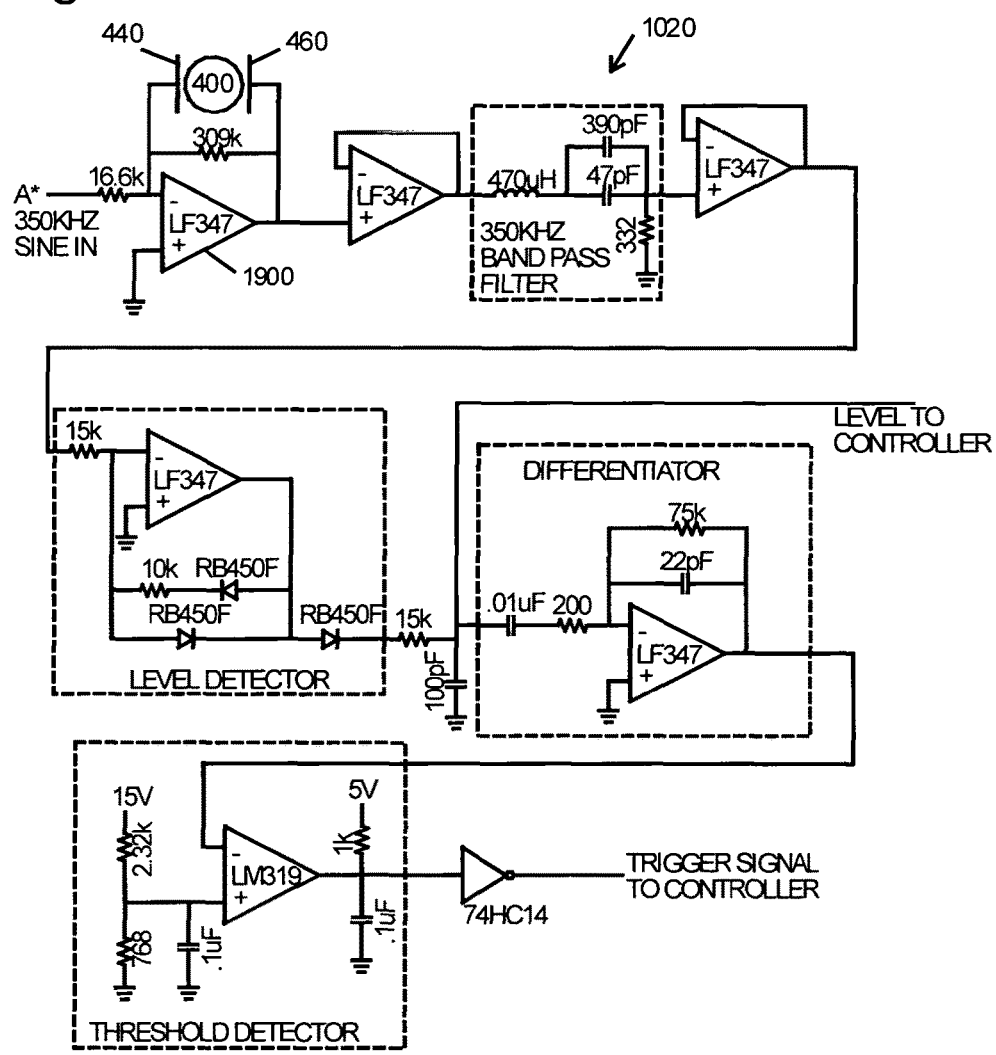
FIG. 22 is a schematic of a contact sense portion of the second alternative subsystem of FIG. 20.

The output of the band pass filter is a 350 khz sine wave that is fed through another buffer amplifier to a sense amplifier 190 shown in FIG. 22. The output of the sense amplifier is fed to plate 440 and the input from plate 460 is fed back to the negative input. When a user touches cutter 400, the feedback on the sense amplifier is reduced, thereby causing the output amplitude to go up. The result of this arrangement is that the drive amplitude on the blade is small during normal use and rises only when a user touches the blade or green wood is cut. In this embodiment, the preferred capacitive coupling of the plates to the blade is about 90 pF each, although other values could be used.

The output of the sense amplifier is fed through a buffer and into a 350 khz band pass filter to filter out any noise that may have been picked up from the blade or plates. The output of the band pass filter is fed through a buffer and into a level detector. The level detector generates a DC output proportional to the amplitude of the sense amplifier. The output of the level detector is smoothed by an RC circuit to reduce ripple and fed into a differentiator. The differentiator generates an output proportional to the rate of change of the sense amplifier output amplitude.

As mentioned above, the sense amplifier output only changes when a user touches the blade or green wood is cut. The change when cutting green wood is slow relative to what happens when a user touches the blade. Therefore, the differentiator is tuned to respond to a user contact, while generating minimal response to green wood. The output of the differentiator is then fed to a comparator that acts as threshold detector to determine if the output of the differentiator has reached a predetermined level set by the a voltage divider network. The output of the threshold detector is fed through a Schmitt-trigger that signals the controller that a contact event has occurred. An RC network acts as a pulse stretcher to insure that the signal lasts long enough to be detected by the controller.

The output from the level detector is also fed to an analog to digital input on the controller. It may be that the under some circumstances, such as while cutting extremely green wood, the response of the sense amplifier will be near saturation. If this happens, the amplifier may no longer be capable of responding to a contact event. In order to provide a warning of this situation, the controller monitors this line to make sure that the detected level stays low enough to allow a subsequent contact to be detected. If an excess impedance load is detected, the controller can shut down the saw without triggering the reaction system to provide the user with a warning. If the user wants to continue, they can initiate the bypass mode as described above.

Figure 23:
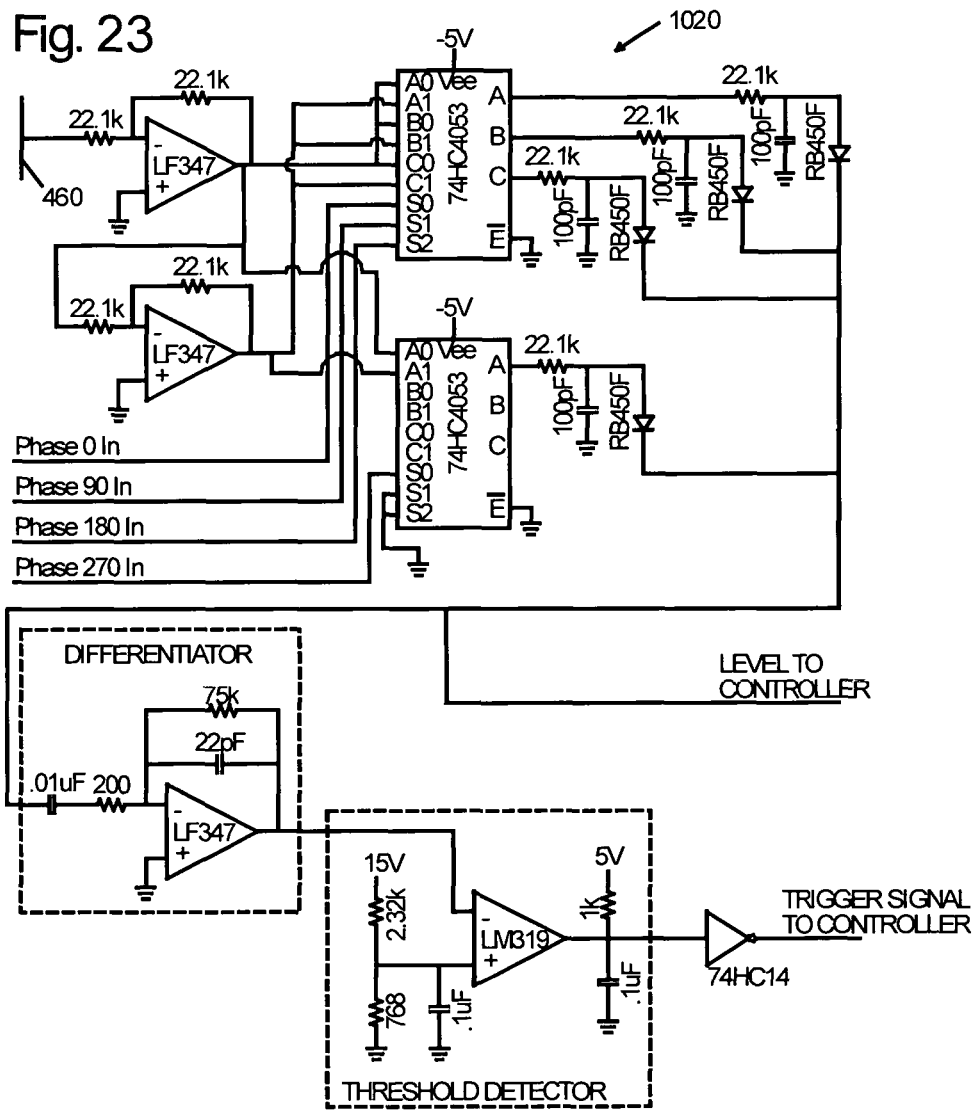
FIG. 23 is a schematic of a contact sense portion of the third alternative subsystem of FIG. 20.

The second of the two alternative detection systems of FIGS. 20-24 is a synchronous detector that uses the phase information generated by the flip-flops in FIG. 21. This system drives plate 44 through the ALT DRIVE circuit shown in FIG. 21. This ALT DRIVE circuit and the detection circuit of FIG. 23 are substituted for the circuit of FIG 22. As shown in FIG. 23, the signal from plate 460 is fed through a pair of buffer/amplifiers into a set of analog switches. The switches are controlled by the phase information from the flip-flops. This arrangement generates an output signal that is proportional to the amplitude of the signal detected from plate 460 with improved noise immunity because of the synchronous detection. The output signal is fed into a differentiator and threshold detector circuit as previously described. These circuits send a trigger signal to the controller when the detected signal amplitude drops at a rate sufficient for the differentiator to have an output exceeding the threshold level.

Figure 24:
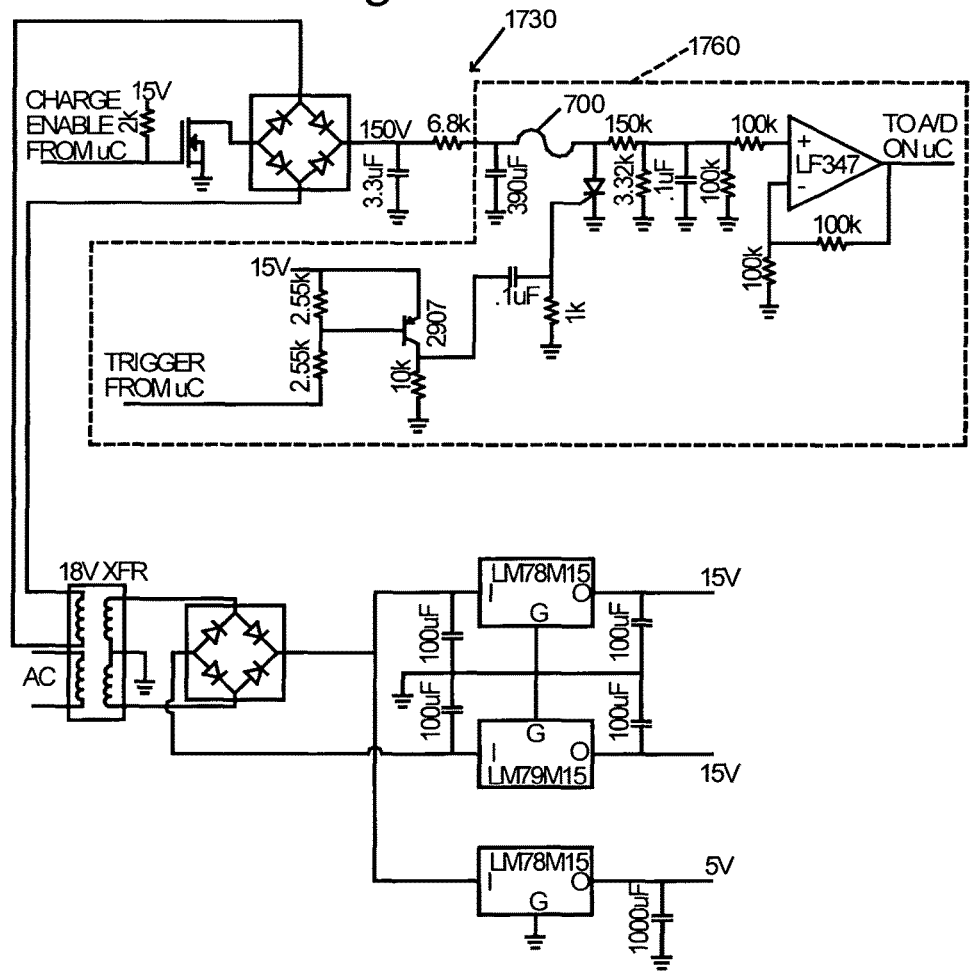
FIG. 24 is a schematic of a power supply and firing system portion of the subsystems of FIG. 20.

FIG. 24 illustrates a power supply and firing system suited for use in these two alternative arrangements. The power supply generates plus and minus 15-volt levels, as well as a 5-volts level. The capacitor in the firing circuit is charged by a secondary input winding on the power transformer. This arrangement provides for isolation of the system ground from the machine ground and avoids the need to step up power supply voltage to the capacitor voltage as accomplished by boost regulator 1750. However, the capacitor charge voltage becomes dependent on the line voltage, which is somewhat less predictable.

The charging circuit for the capacitor is regulated by an enable line from the controller. By deactivating the charging circuit, the controller can monitor the capacitor voltage through an output to an A/D line on the controller. When the capacitor is not being charged, it should discharge at a relatively know rate through the various paths to ground. By monitoring the discharge rate, the controller can insure that the capacitance of the capacitor is sufficient to burn the fusible member. The trigger control from the controller is used to fire the SCR to burn the fusible member.

With any of the above electronic subsystems, it is possible to avoid triggering in the event metal or metal-foiled materials are cut by looking for the amplitude of the signal, or the rate of change, depending on the system, to fall within a window or band rather than simply exceeding or falling below a certain threshold. More particularly, when metal is cut, the detected signal will drop to almost zero, and will drop within a single cycle. Thus, the controller or threshold detection circuitry can be configured to look for amplitude change of somewhat less than 100%, but more than 10% as a trigger event, to eliminate triggering on metal or other conductive work pieces which would normally substantially completely ground the signal.

It should be noted that, although not essential, all of the described embodiments operate at a relatively high frequency — above 100 khz. This high frequency is believed to be advantageous for two reasons. First, with a high frequency, it is possible to detect contact more quickly and sample many cycles of the waveform within a short period of time. This allows the detection system to look for multiple missed pulses rather than just one missed pulse, such as might occur due to noise, to trigger the reaction system. In addition, the higher freguency is believed to provide a better signal to noise ratio when cutting green wood, which has a lower impedance at lower freguencies.

As described above, the present invention provides a band saw which is substantially safer than existing saws. The band saw includes a safety system adapted to detect the occurrence of a dangerous condition, such as a person accidentally touching the moving blade, and to stop movement of the blade to prevent serious injury to a user. The band saw may be used to cut wood, plastic, or other non-conductive material.

The band saw also may be modified for use in the meat cutting industry. In that case, the detection system would be modified so that a user of the band saw would wear a glove with one or more interior wires on which an electrical signal is induced. When the blade cuts into the glove and contacts the interior wires, the blade would ground the wires and the detection subsystem would detect that the signal on the wires had changed. The reaction system would then trigger as described above.

While several particular exemplary embodiments have been described and illustrated, it will be appreciated that many different modifications and alterations may be made within the scope of the invention.

I claim:

1. A band saw comprising:
a frame;
at least two, spaced apart, rotatable wheels supported by the frame;
a blade looped around the wheels, where rotation of at least one wheel causes the blade to move around the wheels;
an electronic circuit adapted to detect contact between a person and the blade, where the electronic circuit uses capacitance to detect the contact, and where the electronic circuit generates a signal upon detection of the contact; and
a reaction system connected to the electronic circuit to receive the signal, where the reaction system is triggerable by the signal to engage and stop the blade within 10 milliseconds after being triggered, and where the reaction system includes a component moveable from a first position away from the blade to a second position in contact with the blade.

2. The band saw of claim 1, where the electronic circuit imparts an electric charge on the blade through a capacitive coupling.

3. The band saw of claim 2, where the wheels are electrically isolated from the frame.

4. The band saw of claim 2, where the blade is electrically isolated from the frame.

5. The band saw of claim 4, where the capacitive coupling includes a conductive plate positioned adjacent the blade.

6. The band saw of claim 2, further comprising a housing a enclosing the wheels, and where the housing is constructed to minimize any capacitive coupling between the housing and the wheels and/or blade.

7. The band saw of claim 2, further comprising a housing enclosing the wheels, where the housing is made at least partially of a non-conductive material.

8. The band saw of claim 1, where the reaction system also includes an electrically triggerable actuator, where the signal triggers the actuator, and where the actuator, when triggered, causes the component to move from the first position to the second position.

* * * * *

UNITED STATES PATENT AND TRADEMARK OFFICE
CERTIFICATE OF CORRECTION

| | | |
|---|---|---|
| PATENT NO. | : 9,927,796 B2 | Page 1 of 1 |
| APPLICATION NO. | : 10/146527 | |
| DATED | : March 27, 2018 | |
| INVENTOR(S) | : Stephen F. Gass | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1049 days.

Signed and Sealed this
Twelfth Day of November, 2024

*Katherine Kelly Vidal*

Katherine Kelly Vidal
*Director of the United States Patent and Trademark Office*